(12) United States Patent
Shimazu et al.

(10) Patent No.: US 12,456,235 B2
(45) Date of Patent: Oct. 28, 2025

(54) IMAGING APPARATUS, IMAGE PROCESSING APPARATUS, DISPLAY SYSTEM, AND VEHICLE

(71) Applicant: KYOCERA Corporation, Kyoto (JP)

(72) Inventors: Tomohiro Shimazu, Yokohama (JP); Kazuya Takemoto, Yokohama (JP)

(73) Assignee: KYOCERA Corporation, Kyoto (JP)

(*) Notice: Subject to any disclaimer, the term of this patent is extended or adjusted under 35 U.S.C. 154(b) by 0 days.

(21) Appl. No.: 18/604,250

(22) Filed: Mar. 13, 2024

(65) Prior Publication Data

US 2024/0221246 A1    Jul. 4, 2024

Related U.S. Application Data

(60) Continuation of application No. 18/156,210, filed on Jan. 18, 2023, now Pat. No. 11,961,162, which is a
(Continued)

(30) Foreign Application Priority Data

Dec. 9, 2016  (JP) .................................. 2016-239449
Dec. 19, 2016 (JP) .................................. 2016-245775

(51) Int. Cl.
*G06T 11/00* (2006.01)
*B60R 1/26* (2022.01)
(Continued)

(52) U.S. Cl.
CPC .............. *G06T 11/001* (2013.01); *B60R 1/26* (2022.01); *G06V 20/58* (2022.01);
(Continued)

(58) Field of Classification Search
CPC ... G06T 11/001; G06T 2200/24; G06T 11/01; G06V 20/58; B60R 1/26; H04N 23/00; H04N 23/54; H04N 5/44504; H04N 7/183
(Continued)

(56) References Cited

U.S. PATENT DOCUMENTS 6,314,364 B1   11/2001  Nakamura
7,069,128 B2    6/2006  Iwama
(Continued)

FOREIGN PATENT DOCUMENTS

JP   H11-34772 A    2/1999
JP   2003-019937 A  1/2003
(Continued)

*Primary Examiner* — Hai Tao Sun
(74) *Attorney, Agent, or Firm* — Studebaker Brackett PLLC

(57) ABSTRACT

A display control apparatus comprising a controller configured to superimpose a first image on a right-side edge region or a left-side edge region of a first video image of a rear area behind a vehicle depending on a position of a first object when a distance between the vehicle and the first object present at right rear side or left rear side of the vehicle decreases while the vehicle is moving at a moving speed smaller than a reference value, and superimpose a second image in a display mode different from the first image on the first video when a distance between the vehicle and a second object behind the vehicle becomes less than a predetermined threshold while the vehicle is moving.

10 Claims, 26 Drawing Sheets

Related U.S. Application Data continuation of application No. 17/231,908, filed on Apr. 15, 2021, now Pat. No. 11,587,267, which is a division of application No. 16/467,715, filed as application No. PCT/JP2017/042292 on Nov. 24, 2017, now Pat. No. 11,010,934.

(51) Int. Cl.

| | |
|---|---|
| *G06V 20/58* | (2022.01) |
| *H04N 5/445* | (2011.01) |
| *H04N 7/18* | (2006.01) |
| *H04N 23/00* | (2023.01) |
| *H04N 23/54* | (2023.01) |

(52) U.S. Cl.
CPC ......... *H04N 5/44504* (2013.01); *H04N 7/183* (2013.01); *H04N 23/00* (2023.01); *H04N 23/54* (2023.01); *G06T 2200/24* (2013.01)

(58) Field of Classification Search
USPC ........................................................ 345/633
See application file for complete search history.

(56) References Cited

U.S. PATENT DOCUMENTS

| | | | |
|---|---|---|---|
| 8,305,204 | B2 | 11/2012 | Nagamine et al. |
| 8,670,034 | B2 | 3/2014 | Hattori et al. |
| 8,692,171 | B2 | 4/2014 | Miller et al. |
| 8,793,053 | B2 | 7/2014 | Ikeda et al. |
| 9,497,422 | B2 | 11/2016 | Mitsuta et al. |
| 9,547,795 | B2 | 1/2017 | Gupta |
| 9,658,078 | B2 * | 5/2017 | Backström ................ G06F 3/14 |
| 9,944,319 | B2 | 4/2018 | Franganillo et al. |
| 10,210,176 | B2 * | 2/2019 | Suzuki ..................... G08G 1/20 |
| 10,321,097 | B2 | 6/2019 | Mitsuta et al. |
| 10,346,694 | B2 | 7/2019 | Irie et al. |
| 10,989,929 | B2 | 4/2021 | Nagano et al. |
| 11,961,162 | B2 * | 4/2024 | Shimazu ............ B62D 15/0295 |
| 2003/0080877 | A1 | 5/2003 | Takagi et al. |
| 2004/0046889 | A1 | 3/2004 | Imoto |
| 2004/0085447 | A1 | 5/2004 | Katta et al. |
| 2004/0130464 | A1 | 7/2004 | Schindler et al. |
| 2005/0010342 | A1 | 1/2005 | Li |
| 2006/0022810 | A1 | 2/2006 | Inoue et al. |
| 2006/0192660 | A1 | 8/2006 | Watanabe et al. |
| 2007/0080585 | A1 | 4/2007 | Lyu |
| 2009/0243888 | A1 | 10/2009 | Kawabata et al. |
| 2010/0045448 | A1 | 2/2010 | Kakinami |
| 2010/0201508 | A1 * | 8/2010 | Green ....................... B60R 1/26 |
| | | | 340/435 |
| 2011/0069169 | A1 | 3/2011 | Kadowaki et al. |
| 2011/0169955 | A1 | 7/2011 | Watanabe et al. |
| 2011/0181441 | A1 | 7/2011 | Ma et al. |
| 2011/0181724 | A1 | 7/2011 | Kadowaki et al. |
| 2012/0133766 | A1 | 5/2012 | Ge |
| 2012/0200664 | A1 | 8/2012 | Lang et al. |
| 2012/0296523 | A1 | 11/2012 | Ikeda et al. |
| 2012/0316779 | A1 | 12/2012 | Kanno et al. |
| 2013/0235204 | A1 | 9/2013 | Buschmann |
| 2013/0321614 | A1 | 12/2013 | Liu |
| 2014/0067206 | A1 | 3/2014 | Pflug |
| 2014/0139677 | A1 | 5/2014 | Lambert et al. |
| 2016/0155269 | A1 | 6/2016 | Cho |
| 2017/0287186 | A1 | 10/2017 | Saito et al. |
| 2017/0371156 | A1 | 12/2017 | Heishi et al. |
| 2017/0374287 | A1 | 12/2017 | Lang |
| 2018/0018939 | A1 * | 1/2018 | Choi ..................... B60K 35/234 |
| 2018/0075658 | A1 | 3/2018 | Lanier et al. |
| 2019/0126824 | A1 | 5/2019 | Oba |
| 2019/0152394 | A1 | 5/2019 | Kadowaki et al. |

FOREIGN PATENT DOCUMENTS

| | | | |
|---|---|---|---|
| JP | 2004-147083 | A | 5/2004 |
| JP | 2005-045602 | A | 2/2005 |
| JP | 2005-318546 | A | 11/2005 |
| JP | 2006-096312 | A | 4/2006 |
| JP | 2006-252389 | A | 9/2006 |
| JP | 2009-040113 | A | 2/2009 |
| JP | 2010-047253 | A | 3/2010 |
| JP | 2010-130646 | A | 6/2010 |
| JP | 2011-151479 | A | 8/2011 |
| JP | 2011-251681 | A | 12/2011 |
| JP | 2012-040883 | A | 3/2012 |
| JP | 2012-227699 | A | 11/2012 |
| JP | 2013-091331 | A | 5/2013 |
| JP | 2013-132976 | A | 7/2013 |
| JP | 2013-144491 | A | 7/2013 |
| JP | 2013-144492 | A | 7/2013 |
| JP | 2014-180046 | A | 9/2014 |
| JP | 2015079421 | A | 4/2015 |
| JP | 5741173 | B2 | 7/2015 |
| JP | 2018-101850 | A | 6/2018 |
| JP | 6720063 | B2 | 7/2020 |

* cited by examiner

40a

40b

40c

IMAGING APPARATUS, IMAGE PROCESSING APPARATUS, DISPLAY SYSTEM, AND VEHICLE

CROSS REFERENCE TO RELATED APPLICATIONS

This present application is a Continuation of U.S. patent application Ser. No. 18/156,210 filed on Jan. 18, 2023, which is a Continuation of U.S. patent application Ser. No. 17/231,908 filed on Apr. 15, 2021, which is a Divisional of U.S. patent application Ser. No. 16/467,715 filed on Jun. 7, 2019, which is the U.S. National Phase of International Application No. PCT/JP2017/042292 filed on Nov. 24, 2017, which claims priority to and the benefit of Japanese Patent Applications No. 2016-239449 filed on Dec. 9, 2016 and No. 2016-245775 filed on Dec. 19, 2016, the entire contents of which are incorporated herein by reference.

TECHNICAL FIELD

The present disclosure relates to an imaging apparatus, an image processing apparatus, a display system, and a vehicle.

BACKGROUND

Conventionally, technologies for displaying video images of an outside area of a moving body such as a vehicle are known. For example, PTL 1 set forth below discloses a technology for controlling power supply to a monitor that displays video images captured by a camera provided to a vehicle.

CITATION LIST

Patent Literature

PTL 1: JP-A-2009-40113

SUMMARY

A display control apparatus comprising a controller configured to superimpose a first image on a right-side edge region or a left-side edge region of a first video image of a rear area behind a vehicle depending on a position of a first object when a distance between the vehicle and the first object present at right rear side or left rear side of the vehicle decreases while the vehicle is moving at a moving speed smaller than a reference value, and superimpose a second image in a display mode different from the first image on the first video when a distance between the vehicle and a second object behind the vehicle becomes less than a predetermined threshold while the vehicle is moving.

DETAILED DESCRIPTION

It is desirable to improve the convenience of technologies for displaying a video image of an outside area of a moving body in an image processing apparatus, an imaging apparatus, a display system, and a vehicle. Hereinafter, an embodiment of the present disclosure will be described with reference to the accompanying drawings.

Display System

A display system 10 according to the embodiment of the present disclosure will be described with reference to FIG. 1.

Figure 1:
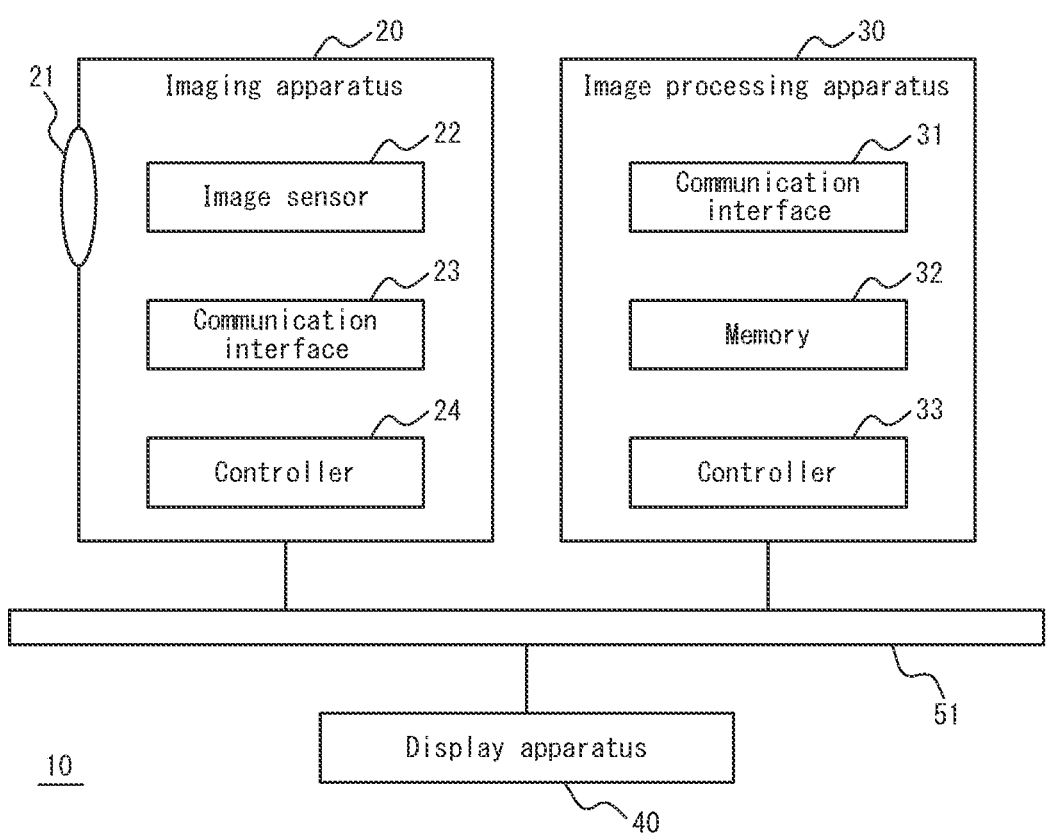
FIG. 1 is a block diagram schematically illustrating a configuration of a display system according to an embodiment of the present disclosure.

As illustrated in FIG. 1, the display system 10 includes an imaging apparatus 20, an image processing apparatus 30, and a display apparatus 40. Each constituent element of the imaging apparatus 20 and the display system 10 can transmit and receive information via, for example, a network 51. The network 51 may include, for example, wireless communication, wired communication, or a CAN (Controller Area Network).

In some embodiments, some or all of the constituent elements of the display system 10 may be integrally formed as one apparatus. For example, the image processing apparatus 30 may be incorporated in the imaging apparatus 20 or the display apparatus 40.

Figure 2:
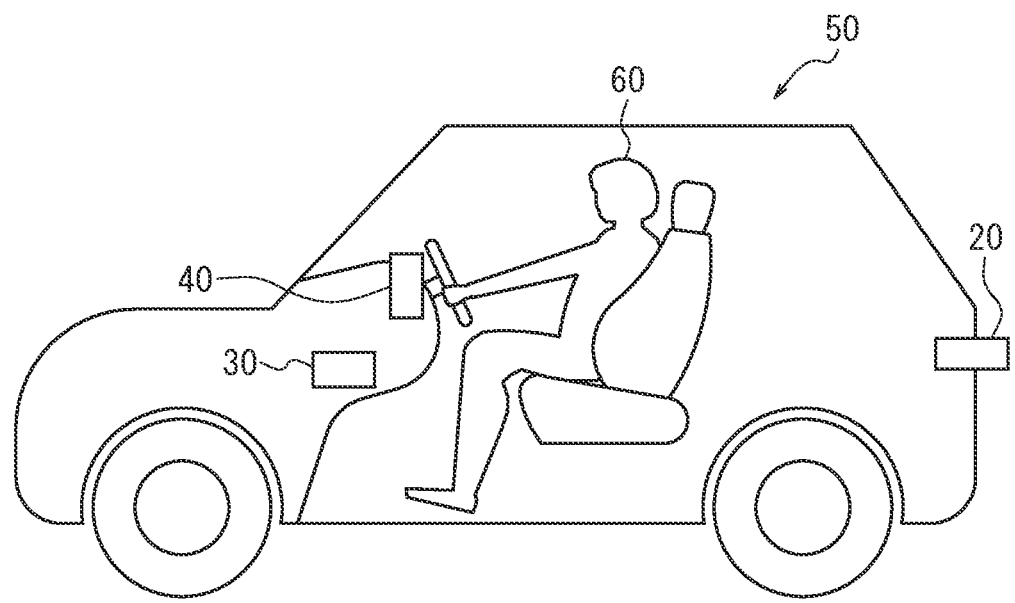
FIG. 2 is a diagram illustrating a vehicle having the display system mounted thereon viewed from a left side.

As illustrated in FIG. 2, the imaging apparatus 20, the image processing apparatus 30, and the display apparatus 40 may be provided to a moving body 50. The term "moving body" as used herein encompasses, for example, vehicles, watercraft, and aircraft. Vehicles include, for example, automobiles, industrial vehicles, rail vehicles, domestic vehicles, and fixed-wing aircraft that travel on a runway. Automobiles may include, for example, cars, trucks, buses, motorcycles, and trolley buses. Industrial vehicles include, for example, agricultural vehicles and construction vehicles. Industrial vehicles for industrial purposes include, for example, forklifts and golf carts. Industrial vehicles for agricultural purpose include, for example, tractors, tillers, transplanters, binders, combine harvesters, and lawn mowers. Industrial vehicles for construction purposes include, for example, bulldozers, scrapers, excavators, crane trucks, dump trucks, and load rollers. Vehicles may include those that travel on human power. Vehicle classifications are not limited to the above examples. For example, vehicles may include industrial vehicles authorized to travel on the road. The same type of vehicle may be included in a plurality of categories. Watercraft may include, for example, jetboats, motorboats, and tankers. Aircraft may include, for example, fixed-wing aircraft and rotorcraft.

The imaging apparatus 20 can capture an outside area of the moving body 50. The imaging apparatus 20 may be disposed at any position inside or outside of the moving body 50. For example, the imaging apparatus 20 is positioned in a rear portion of the moving body 50 as illustrated in FIG. 2 to be able to capture an outside area behind the moving body 50. The image processing apparatus 30 may be disposed at any position in the moving body 50. The display apparatus 40 can be viewed by a subject 60. The display apparatus 40 may be disposed in any position in the moving body 50. For example, the display apparatus 40 is disposed in a dashboard of the moving body 50 as illustrated in FIG. 2.

Imaging Apparatus

The imaging apparatus 20 will be described in detail. The imaging apparatus 20 includes an imaging optical system 21, an image sensor 22, a communication interface 23, and a controller 24, as illustrated in FIG. 1 by way of example.

The imaging optical system 21 forms a subject image. For example, the imaging optical system 21 may include an aperture and one or more lenses.

The image sensor 22 includes a plurality of pixels arranged in a two-dimensional manner. The image sensor 22 may include, for example, a CCD (Charge Coupled Device) image sensor or a CMOS (Complementary Metal Oxide Semiconductor) image sensor. The image sensor 22 can capture a subject image formed by the imaging optical system 21 and generate a captured image.

The communication interface 23 may include a communication interface capable of communicating with an external apparatus. The communication interface 23 may be capable of transmitting and receiving information via the network 51. The external apparatus may include, for example, the image processing apparatus 30. The term "communication interface" as used herein may include, for example, a physical connector or a wireless communication device. The physical connector may include an electrical connector which supports transmission of electrical signals, an optical connector which supports transmission of optical signals, or an electromagnetic connector which supports transmission of electromagnetic waves. The electrical connector may be a connector conforming to IEC60603, a connector conforming to the USB standard, a connector compatible with an RCA connector, a connector compatible with an S-terminal defined by EIAJ CP-1211A, a connector compatible with a D-terminal defined in EIAJ RC-5237, a connector conforming to the HDMI® (HDMI is a registered trademark in Japan, other countries, or both) standard, or a connector compatible with a coaxial cable including BNC (British Naval connector, Baby-series N connector, or the like). The optical connector may include a variety of connectors conforming to IEC 61754. The wireless communication device may include those conforming to Bluetooth® (Bluetooth is a registered trademark in Japan, other countries, or both) or standards including IEEE802.11. The wireless communication device includes at least one antenna.

The controller 24 includes at least one processor. The term "processor" as used herein may include a specialized processor dedicated to specific processing or a general-purpose processor configured to perform a specific function by reading a specific program. The specialized processor may include a DSP (Digital Signal Processor) or an ASIC (Application Specific Integrated Circuit). The processor may include a PLD (Programmable Logic Device). The PLD may include an FPGA (Field-Programmable Gate Array). The controller 24 may be one of a SoC (System-on-a-Chip) and a SiP (System In a Package) in which one or more processors cooperate with one another.

The controller 24 is configured to control overall operation of the imaging apparatus 20. The controller 24 may cause the image sensor 22 to generate captured images at any frame rate. The frame rate may approximately correspond to, for example, a frame rate at which images can be displayed on the display apparatus 40. The controller 24 may perform predetermined image processing on the captured image. The image processing may include, for example, exposure adjustment, white balancing, distortion correction, and the like. The controller 24 outputs the captured image to the image processing apparatus 30 via the communication interface 23. For example, the controller 24 may sequentially output captured images at the frame rate described above. Hereinafter, each captured image output at the frame rate described above will also be simply referred to as a frame. A plurality of captured images output from the imaging apparatus 20 will also be referred to as first video images. For example, when the frame rate is 60 fps (Flame per Seconds), sixty images captured each second are output as the first video images.

Image Processing Apparatus

The image processing apparatus 30 will be described in detail. The image processing apparatus 30 includes a communication interface 31, a memory 32, and a controller 33.

The communication interface 31 may include a communication interface capable of communicating with various external apparatuses. The external apparatuses may include, for example, the imaging apparatus 20, the display apparatus 40, an ECU (Electronic Control Unit or Engine Control Unit) provided to the moving body 50, a speed sensor, an acceleration sensor, a rotation angle sensor, a steering angle sensor, an engine speed sensor, an accelerator sensor, a brake sensor, an illumination sensor, a raindrop sensor, a travel distance sensor, an obstacle detection device using a millimeter wave radar, an ultrasonic sonar or the like, an ETC (Electronic Toll Collection system) receiving apparatus, a GPS (Global Positioning System) apparatus, a navigation apparatus, an Internet server, a cellular phone, and the like.

The communication interface 31 may include a communication interface for pedestrian-vehicle communication, road-vehicle communication, and inter-vehicle communication. The communication interface 31 may include a receiver which is compatible with a light beacon for DSRC (Dedicated Short-Range Communication: a narrowband communication system) or VICS® (Vehicle Information and Communication System: VICS is a registered trademark in Japan, other countries, or both) provided in Japan. The communication interface 31 may include a receiver which is compatible with the road traffic information providing systems of other countries.

The communication interface 31 may be capable of acquiring various information from the external apparatuses. For example, the communication interface 31 may be capable of acquiring moving body information and environmental information.

The moving body information may include any information associated with the moving body 50. For example, the moving body information may include, with respect to the moving body 50, a speed, an acceleration, a turning gravity, an inclination, a direction, a turning status, a steering angle of the steering wheel, the temperature of the cooling water, a fuel remaining amount, a battery remaining amount, a battery voltage, an engine speed, a gear position, presence or absence of a reverse signal, the presence or absence of accelerator operation, an accelerator position, the presence or absence of brake operation, the brake pedal pressing degree, the presence or absence of parking brake operation, a rotational speed difference between the front and rear wheels or 4 wheels, tire pressure, an expansion and contraction amount of the damper, the spatial position of the eyes of the driver, the number of passengers and seat positions, seat belt fastening information, opening and closing of the doors, opening and closing of the windows, interior temperature, the presence or absence of operation of the air conditioning, air-conditioning setting temperature, an air-conditioning air volume, outside air circulation setting, an operating condition of the wiper, a driving mode, information about connection to an external device, current time, average fuel consumption, current fuel consumption, lighting states of various lamps, positional information, and route information to a destination. The various lamps may include, for example, headlamps, fog lamps, reversing lamps, position lamps, and indicator lamps.

The environmental information may include any information about the environment outside of the moving body 50. The environmental information may include, for example, brightness around the moving body 50, the weather, air pressure, outside air temperature, map information, traffic information, road construction information, temporary change of the speed limit of the road, objects detected by other vehicles, and lighting states of traffic signals.

The memory 32 may include a temporary storage device and a secondary storage device. The memory 32 may include, for example, a semiconductor memory, a magnetic memory, or an optical memory. The semiconductor memory may include a volatile memory or a nonvolatile memory. The magnetic memory may include, for example, a hard disk or a magnetic tape. The optical memory may include, for example, a CD (Compact Disc), a DVD (Digital Versatile Disc), and BD® (Blu-ray Disc®); BD and Blu-ray are registered trademarks in Japan, other countries, or both). The memory 32 stores various information and programs necessary for the operation of the image processing apparatus 30.

The controller 33 includes one or more processors. The controller 33 controls overall operations of the image processing apparatus 30.

The controller 33 may acquire the moving body information and the environmental information from an external apparatus via the communication interface 31. The controller 33 may determine a predicted path of the moving body 50 on the basis of, for example, the moving body information. Hereinafter, the predicted path of the moving body 50 will also be referred to as a first predicted path.

The controller 33 may acquire the first video images from the imaging apparatus 20 via the communication interface 31. The first video images include a detection region and a display region.

The controller 33 may detect at least a portion of a detection object in the detection region of the acquired first video images. The detection region of the first video images may be at least a portion of a captured image for each frame of the first video images. Each frame of the first video images may be referred to as a captured image. The detection region of the first video images may be larger than the display region. The detection region of the first video images may encompass the display region. The controller 33 can detect the detection object located inside of the display region. The controller 33 can detect the detection object located outside of the display region and inside of the detection region. A region inside of the detection region and the display region may be referred to as a first region. A region inside of the detection region and outside of the display region may be referred to as a second region.

The detection object may include a plurality of types of objects. The types of objects may include, for example, a person, another moving body, a road, a lane, a white line, a gutter, a sidewalk, a pedestrian crossing, a road sign, a traffic sign, a guardrail, a wall, and a traffic signal. The types of objects detectable by the controller 33 are not limited these examples. In a case where a portion of the detection object is concealed behind another body in the first video images, the detection object may include at least a portion that is not concealed behind the body. For example, when the lower body of a pedestrian is concealed behind an obstacle in the first video images, the controller 33 may detect the upper body of the pedestrian. Any appropriate object detection algorithms may be employed for the detection of at least a portion of the detection object. For example, the controller 33 may detect at least a portion of the detection object by employing algorithm such as pattern matching feature point extraction using the captured image for each frame of the first video images.

When the controller 33 detects at least a portion of the detection object in the first video images, the controller 33 may determine a predicted path of the detection object on the basis of the first video images. Hereinafter, the predicted path of the detection object will also be referred to as a second predicted path. Any appropriate algorithm may be employed for the determination of the second predicted path. For example, the controller 33 may determine the second predicted path on the basis of changes in the orientation and position of the detection object in the captured image for each frame of the first video images.

When the controller 33 detects at least a portion of the detection object in the first video images, the controller 33 may estimate a relative positional relationship between the moving body 50 and the detection object on the basis of the first video images. The relative positional relationship may include, for example, a distance between the moving body 50 and the detection object, or whether the first predicted path of the moving body 50 and the second predicted path of the detection object overlap with each other. Any appropriate algorithm may be employed for the estimation of the distance between the moving body 50 and the detection object. For example, the controller 33 may estimate the distance between the moving body 50 and the detection object by employing a motion stereo method using the captured image for each frame of the first video images signal. In some embodiments, the controller 33 may acquire information indicating the relative positional relationship between the moving body 50 and the detection object from an external apparatus via the communication interface 31.

When the distance between the moving body 50 and the detection object decreases, the controller 33 may determine which one of the moving body 50 and the detection object contributes more to the decrease in distance. Any appropriate algorithm may be employed to determine the respective contributions of the moving body 50 and the detection object with respect to the decrease in distance. In one example, the controller 33 may detect a moving speed of the moving body 50 on the basis of the moving body information. The controller 33 may detect a moving speed of the detection object on the basis of, for example, a positional change of the detection object in the captured image for each frame of the first video images. The controller 33 may determine that one of the moving body 50 and the detection object that has a greater moving speed contributes more to the decrease in distance. In another example, when the moving speed of the moving body 50 is smaller than a reference value, the controller 33 may determine that the detection object contributes more to the decrease in distance. When the moving speed of the moving body 50 is equal to or larger than the reference value, the controller 33 may determine that the moving body 50 contributes more to the decrease in distance. The reference value may be set appropriately, and may for example be set to approximately zero. Operation of the image processing apparatus 30 on the basis of the respective contributions of the moving body 50 and the detection object with respect to the decrease in distance will be described in detail later.

When at least a portion of the detection object is detected in the first video images, the controller 33 may determine on the basis of the first video images whether there is a possibility of contact between the moving body 50 and the detection object. Any appropriate algorithm may be employed to determine the possibility of contact between the moving body 50 and the detection object. For example, when at least one of a condition specifying that the distance between the moving body 50 and the detection object is smaller than a predetermined threshold and a condition specifying that a rate at which the distance is decreasing is equal to or greater than a predetermined threshold is met, the controller 33 may determine that there is a possibility of contact between the moving body 50 and the detection object. Operation of the image processing apparatus 30 in accordance with the presence or absence of the possibility will be described in detail later.

The controller 33 may cause second video images corresponding to the display region of the first video images acquired from the imaging apparatus 20 to be displayed on the display apparatus 40. In particular, the controller 33 may output the second video images to the display apparatus 40 via the communication interface 31. For example, when the controller 33 detects a rearward movement of the moving body 50 on the basis of the moving body information, the controller 33 may cause the second video images to be displayed on the display apparatus 40. For example, the controller 33 may detect the rearward movement on the basis of a shift position of the transmission gear. For example, the controller 33 may detect the rearward movement on the basis of a reverse signal output from the moving body at the time of a rearward movement. The second video images may include, for example, a video image extracted from the display region of the captured image for each frame of the first video images. The display region of the first video images may be at least a region of the captured image for each frame of the first video images. The display region may be smaller than the detection region. The display region may be encompassed within the detection region. A position, a shape, and a size of the display region may be determined appropriately. The controller 33 may change the position, the shape, and the size of the display region. The position, the shape, and the size of the display region may be changed to substantially match the detection region.

The controller 33 may cause various markers in combination with the second video images to be displayed on the display apparatus 40. A method for such combining includes overwriting or mixing. The marker may include, for example, one or more images. The controller 33 may dynamically change a display mode of at least a portion of the marker superimposed on the second video images. The display mode may include, for example, a position, a size, a shape, a color, or a shading of at least a portion of a marker in the second video images. When the controller 33 displays a marker corresponding to the detection object detected in the first video images, the controller 33 may determine the display mode of the marker in accordance with the type of the marker. The operation of the image processing apparatus 30 for causing various markers to be displayed on the display apparatus 40 will be described in detail later.

Display Apparatus

The display apparatus 40 will be described in detail. The display apparatus 40 may include, for example, a liquid crystal display or an organic EL (Electro-Luminescence) display. The display apparatus 40 may display, for example, the second video images input from the image processing apparatus 30 via the network 51. The display apparatus 40 may function as a touchscreen capable of receiving user operations. The display apparatus 40 may include a switch or a key capable of receiving a user operation. The switch may include a mechanical switch or an electronic switch. The key may include a mechanical key or an electronic key. When the display apparatus 40 receives a user operation, the display apparatus 40 may transmit a user input corresponding to the user operation to the image processing apparatus 30.

Figure 3A:
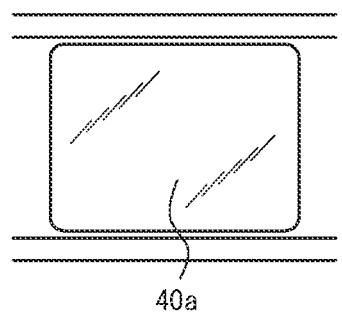
FIG. 3A is a diagram schematically illustrating an example of the exterior of the display apparatus of FIG. 1.
Figure 3B:
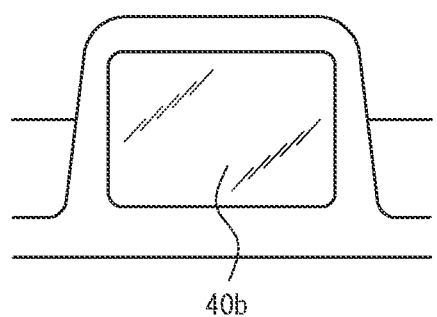
FIG. 3B is a diagram schematically illustrating an example of the exterior of the display apparatus of FIG. 1.
Figure 3C:
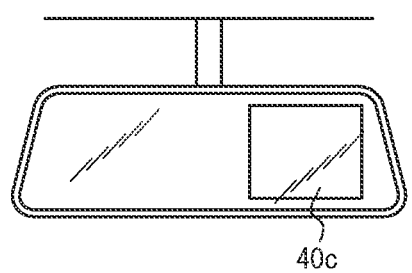
FIG. 3C is a diagram schematically illustrating an example of the exterior of the display apparatus of FIG. 1.
Figure 3D:
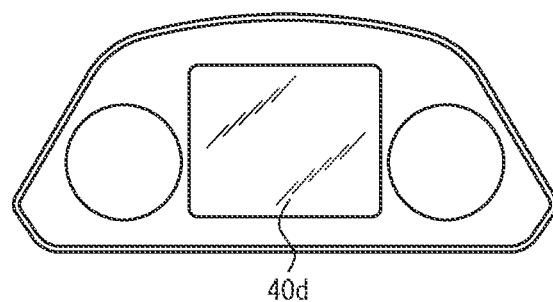
FIG. 3D is a diagram schematically illustrating an example of the exterior of the display apparatus of FIG. 1.
Figure 3E:
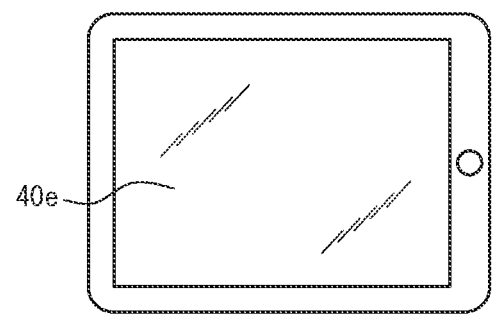
FIG. 3E is a diagram schematically illustrating an example of the exterior of the display apparatus of FIG. 1.

The display apparatus 40 may be arranged at various locations of the moving body 50. FIG. 3A to FIG. 3E illustrate example arrangement of the display apparatus 40. FIG. 3A illustrates a display apparatus 40a of an in-dashboard type arranged in the dashboard of the vehicle. FIG. 3B illustrates a display apparatus 40b of an on-dashboard type arranged on the dashboard. In FIG. 3B, the display apparatus 40b is incorporated in the moving body 50. The display apparatus 40b may be detachably attached on the dashboard. FIG. 3C illustrates a display apparatus 40c that is built into a room mirror and capable of displaying a video image as necessary. FIG. 3D illustrates a display apparatus 40d built in an instrumental panel. In FIG. 3D, the display apparatus 40d is arranged adjacent to the instruments such as a speedometer and a tachometer. In one embodiment, the display apparatus 40d may be configured as an LCD or the like and may constitute the entire instrumental panel that display a second video image together with images of the speedometer and the tachometer. FIG. 3E illustrates a display apparatus 40e that is configured as a mobile information terminal such as a tablet computer. The display apparatus 40e may be configured as a mobile phone display.

The second video images and the various markers displayed on the display apparatus 40 under the control of the image processing apparatus 30 will be described in detail with reference to FIG. 4 to FIG. 18. According to the present disclosure, the terms "up-down direction" and "left-right direction" in a video image or an image correspond to the two-dimensional directions in the video image or the image. According to the present disclosure, the terms "height direction", "horizontal direction", and "depth direction" in a video image or an image correspond to the three-dimensional directions in the space captured in the video image or the image.

First Example (Reference Example)

Figure 4:
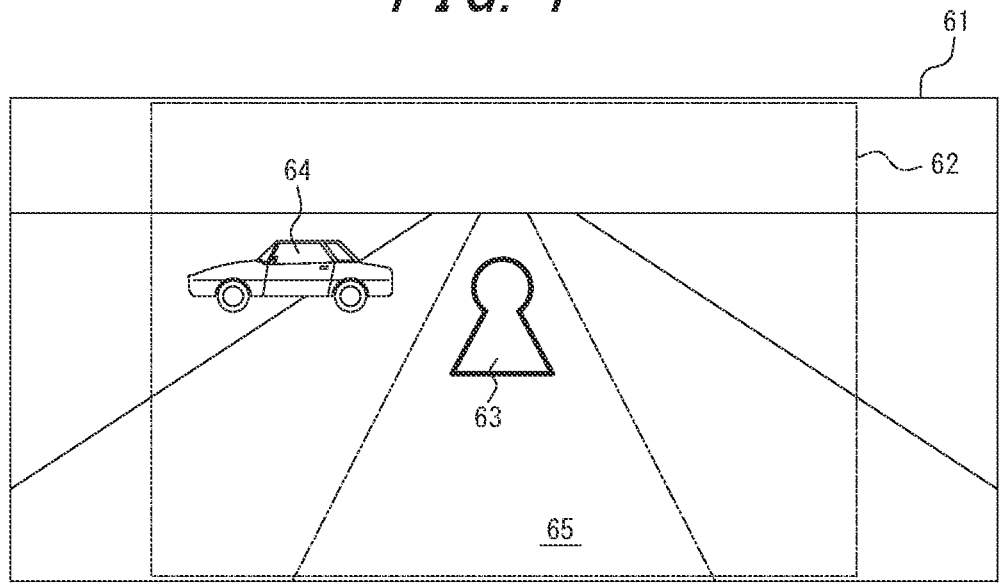
FIG. 4 is a diagram illustrating a first example of a first video image.

FIG. 4 illustrates a first example of a detection region 61 of a first video image acquired by the image processing apparatus 30 from the imaging apparatus 20. In the example illustrated in FIG. 4, the detection region 61 is longer in the left-right direction than the up-down direction. The display region 62 is positioned in the center of the detection region 61 with respect to the left-right direction. The controller 33 may detect each of a pedestrian 63 and a vehicle 64 captured in the display region 62 of the first video image as a detection object.

The controller 33 determines whether one or more conditions are met on the basis of a relative positional relationship between a detection object detected within the display region 62 of the first video image and the moving body 50.

The one or more conditions may include, for example, a first condition specifying that the detection object is located on the first predicted path 65 of the moving body 50. The one or more conditions may include, for example, a second condition specifying that at least a portion of the first predicted path 65 of the moving body 50 and at least a portion of the second predicted path of the detection object overlap with each other. When the controller 33 determines that one or more of the conditions are met, the controller 33 may cause a predetermined marker corresponding to the detection object to be superimposed on the second video images and displayed on the display apparatus 40. The predetermined marker may include a first marker, a second marker, or a third marker.

In the first example, the controller 33 may determine that the one or more conditions are met with respect to the pedestrian 63. In this case, the controller 33 may display a marker corresponding to the pedestrian 63. The controller 33 may determine that the one or more conditions are not met with respect to the vehicle 64. In this case, the controller 33 does not display the marker corresponding to the vehicle 64.

Figure 5:
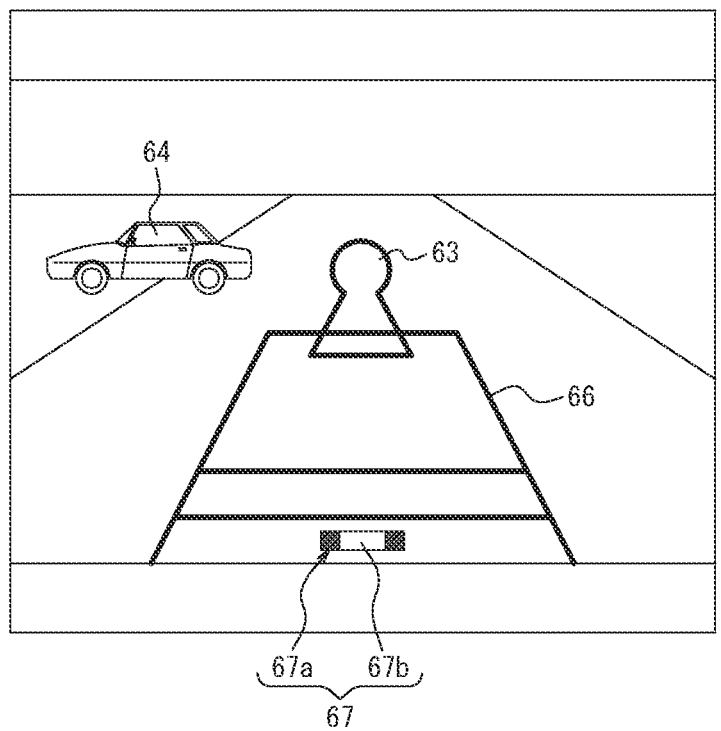
FIG. 5 is a diagram illustrating a first example of a second video image corresponding to a display region of the first video image of FIG. 4.

FIG. 5 illustrates an example of a second video image corresponding to the display region 62 of the first video image illustrated in FIG. 4. When an aspect ratio of the display region 62 of the first video image differs from an aspect ratio of the screen of the display apparatus 40, the controller 33 may output the second video image obtained by cutting out the display region 62 of the first video image and modifying the display region 62 in accordance with the aspect ratio of the screen of the display apparatus 40. The second video image includes the pedestrian 63 and the vehicle 64 as illustrated in FIG. 5.

The controller 33 may cause guide lines 66 which indicate at least a portion of the first predicted path 65 of the moving body 50 illustrated in FIG. 4 by way of example to be superimposed on the second video image and displayed on the display apparatus 40. The controller 33 may dynamically change the guide lines 66 on the basis of, for example, a change of the steering angle of the steering wheel.

An area of the first video image is wider than the display region 62. The controller 33 may change the area of the display region 62. The controller 33 may cause an icon image 67 to be superimposed on the second video image and displayed on the display apparatus 40. For example, an outline 67a of the icon image 67 illustrated in FIG. 4 corresponds to a maximum area of the display region 62 when the area of the display region 62 is changed. A white rectangle 67b of the icon image 67 corresponds to the display region 62. The icon image 67 illustrated in FIG. 4 indicates a position and a size of the display region 62 relative to the maximum area of the display region 62.

Figure 6:
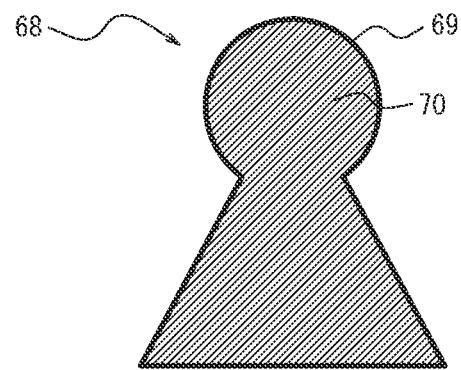
FIG. 6 is a diagram illustrating an example of a third marker to be superimposed on a detection object.

FIG. 6 illustrates an example of a marker to be superimposed on the pedestrian 63 in the second video image. Hereinafter, this marker will also be referred to as a third marker 68. An outline 69 of the third marker 68 may substantially match the outline of the pedestrian 63 detected in the second video image. A region 70 within the outline 69 of the third marker 68 may be filled with a color or pattern corresponding to the type of the detection object, e.g., "person". When the pedestrian 63 is detected in the first video image, the controller 33 may cause the third marker 68 to be superimposed on the pedestrian 63 in the second video image and displayed on the display apparatus 40. This configuration enables the subject 60 to easily view the pedestrian 63 in the second video image. The controller 33 may hide the third marker 68 when a predetermined time has elapsed after the third marker 68 is displayed.

Figure 7:
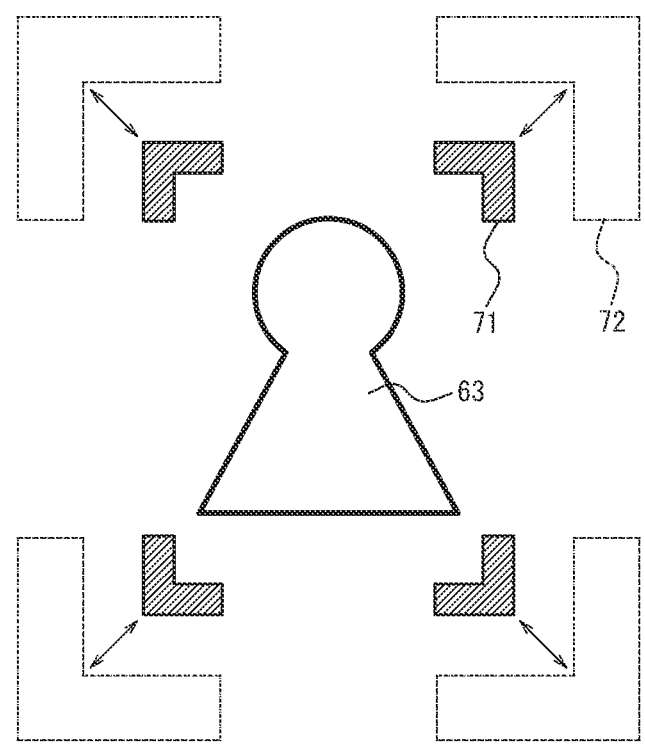
FIG. 7 is a diagram illustrating a first example of a first marker and a second marker displayed in the vicinity of the detection object.

FIG. 7 illustrates examples of two types of markers superimposed in the vicinity of the pedestrian 63 in the second video image. Hereinafter, each of the two types of markers will also be referred to as a first marker 71 and a second marker 72. For example, the controller 33 may cause the first marker 71 and the second marker 72 to be superimposed on the second video image and displayed on the display apparatus 40 after hiding the third marker 68.

The controller 33 may move a position of the first marker 71 following the pedestrian 63 in the second video image. The subject 60 may easily recognize the pedestrian 63 because the first marker 71 follows the pedestrian 63. The first marker 71 is displayed in the vicinity of the pedestrian 63 in a manner spaced apart therefrom. The subject 60 may easily recognize the behavior of the pedestrian 63 when the first marker 71 is displayed on the display apparatus 40. The controller 33 may change a superimposing position of the second marker 72 relative to a superimposing position of the first marker 71 in the second video image. The controller 33 may move the second marker 72 relative to the position of the first marker 71 serving as a reference.

For example, when the distance between the moving body 50 and the pedestrian 63 decreases, the controller 33 may determine that the moving body 50 contributes more to the decrease in distance. In this case, the controller 33 may move the second marker 72 toward the first marker 71. First, the controller 33 displays the second marker 72 in a position distanced from the first marker 71. Subsequently, the controller 33 moves the second marker 72 toward the first marker 71 until the distance therebetween reaches a predetermined distance. Next, the controller 33 hides the second marker 72. Then, the controller 33 displays the second marker 72 in a position distanced from the first marker 71 and repeats the operation described above. In this example, the second marker 72 approaches the first marker 71 displayed as an object. Thus, the subject 60 can recognize that the second marker 72 is approaching the first marker 71.

For example, when the distance between the moving body 50 and the pedestrian 63 decreases, the controller 33 may determine that the pedestrian 63 contributes more to the decrease in the distance. In this case, the controller 33 may move the second marker 72 away from the first marker 71. First, the controller 33 displays the second marker 72 in the vicinity of the first marker 71. Subsequently, the controller 33 moves the second marker 72 away from the first marker 71 until the distance therebetween reaches a predetermined distance. Next, the controller 33 hides the second marker 72. Then, the controller 33 displays the second marker 72 in the vicinity of the first marker 71 and repeats the operation described above. In this example, the second marker 72 is moving away from the first marker 71 displayed as the object. Thus, the subject 60 can recognize that the second marker 72 is moving away from the first marker 71.

The controller 33 changes a moving direction of the second marker 72 relative to the first marker 71 on the basis of the respective contributions of the moving body 50 and the pedestrian 63 with respect to the decrease in distance between the moving body 50 and the pedestrian 63. For example, the subject 60 can recognize whether the moving body 50 is approaching the pedestrian 63 or whether the pedestrian 63 is approaching the moving body 50, on the basis of the moving direction of the second marker 72.

Figure 8:
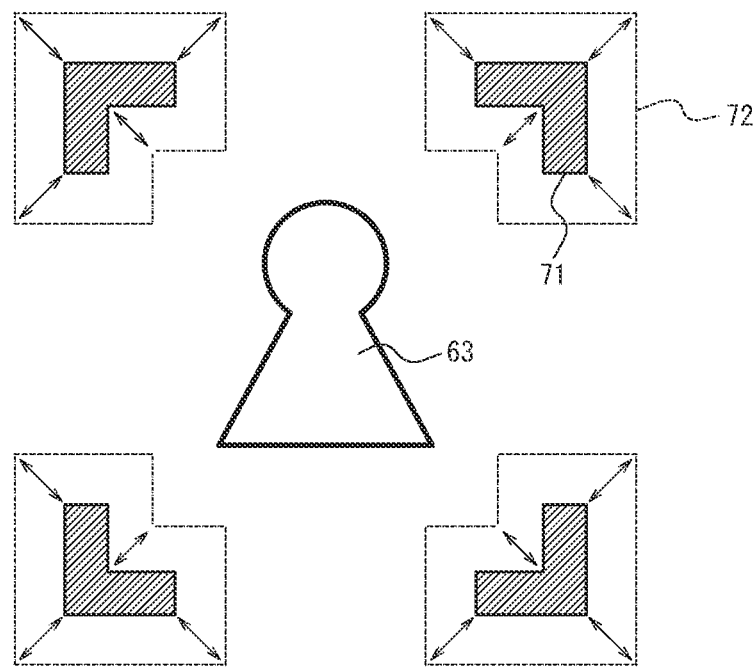
FIG. 8 is a diagram illustrating a second example of the first marker and the second marker displayed in the vicinity of the detection object.
Figure 9:
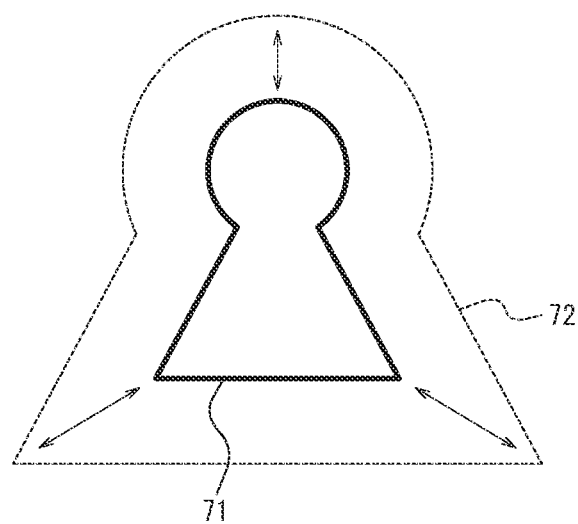
FIG. 9 is a diagram illustrating a third example of the first marker and the second marker displayed in the vicinity of the detection object.

The controller 33 may repeatedly expand and contract the second marker 72 centered on the first marker 71 in the second video image as illustrated in FIG. 8 by way of example. The controller 33 may superimpose the first marker 71 or the second marker 72 having the same shape as the outline 69 of the pedestrian 63 in the second video image as illustrated in FIG. 9 by way of example. The controller 33 may repeatedly expand or contract the second marker 72 centered on the first marker 71. The controller 33 changes between expansion and contraction of the second marker 72 in accordance with the respective contributions of the moving body 50 and the pedestrian 63 with respect to the decrease in distance between the moving body 50 and the pedestrian 63.

When the distance between the detection object and the moving body 50 represented by the first marker 71 and the second marker 72, respectively, becomes smaller than a predetermined threshold, the controller 33 may superimpose another marker on the second video image. Hereinafter, the another marker will also be referred to as a fourth marker. The fourth maker may include any appropriate image. For example, the fourth marker may include an image showing an exclamation mark "!". In this configuration, for example, when the pedestrian 63 and the moving body 50 represented by the first marker 71 and the second marker 72, respectively, become close to each other and have a certain distance or less therebetween, the fourth marker is superimposed on the second video image and displayed. The fourth marker enables recognition that, for example, the pedestrian 63 is positioned in the vicinity of the moving body 50. In some embodiments, the controller 33 may change display modes of the first marker 71 and the second marker 72 when the distance between the detection object and the moving body 50 represented by the first marker 71 and the second marker 72, respectively, falls below the predetermined threshold. For example, the controller 33 may change the colors of the first marker 71 and the second marker 72. This configuration for changing the colors of the markers enables the subject 60 to recognize that, for example, the pedestrian 63 is positioned in the vicinity of the moving body 50.

The controller 33 can detect two detection objects located one behind the other in the depth direction. The controller 33 may display the first marker 71 and the second marker 72 representing the respective two detection objects located one behind the other. The controller 33 may display the first marker 71 and second marker 72 in different appearances together with the two detection objects. For example, the controller 33 may display the first marker 71 and the second marker 72 of a first detection object located on the rear side in an inconspicuous manner as compared to the first marker 71 and the second marker 72 of a second detection object located on the front side. For example, the controller 33 may change characteristics of the first marker 71 and the second marker 72 of the first detection object located on the rear side in the depth direction such that they are dark in color and have a high transmittances and thin lines as compared to the first marker 71 and the second marker 72 of the second detection object located on the front side.

Second to Fourth Examples (Reference Examples)

Figure 10:
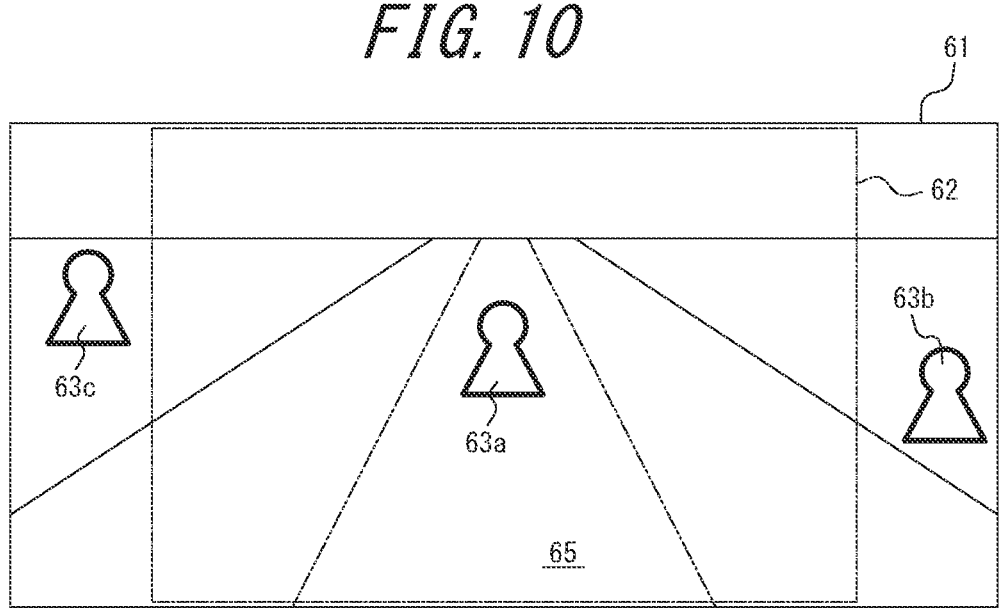
FIG. 10 is a diagram illustrating a second example of the first video image.

FIG. 10 illustrates a second example of the detection region 61 of the first video image acquired from the imaging apparatus 20 by the image processing apparatus 30. In the example illustrated in FIG. 10, the detection region 61 is longer in the left-right direction than the up-down direction. The display region 62 is positioned at the center in the left-right direction of the detection region 61. The controller 33 may detect each of the pedestrian 63a located inside of the display region 62 of the first video image and the pedestrians 63b and 63c located inside of the detection region 61 and outside of the display region 62 as a detection object. The controller 33 performs the same processing on the pedestrian 63a as the processing performed on the pedestrian 63 as illustrated in FIG. 4 by way of example.

When a detection position of the detection object in the first video image is outside of the display region 62 and, simultaneously, inside of the detection region 61, the controller 33 may cause a marker corresponding to the detection object to be superimposed on the second video image and displayed on the display apparatus 40. Hereinafter, this marker will also be referred to as a fifth marker. When the controller 33 determines that there is a possibility of contact between the moving body 50 and the detection object, the controller 33 may display the fifth marker. When the detection position of the detection object in the first video image is located on the right side of the display region 62, the controller 33 may cause the fifth marker to be superimposed on the right-side edge region of the second video images and displayed on the display apparatus 40. When the detection position of the detection object in the first video image is located on the left side of the display region 62, the controller 33 may cause the fifth marker to be superimposed on the left-side edge region of the second video image and displayed on the display apparatus 40.

In the second example, a detection position of the pedestrian 63b is located on the right side of the display region 62. The controller 33 may determine that there is a possibility of contact between the moving body 50 and the pedestrian 63b. In this case, the controller 33 may cause the fifth marker corresponding to the pedestrian 63b to be superimposed on the right-side edge region of the second video image and displayed in the display apparatus 40. The fifth marker corresponding to the pedestrian 63b will be described in detail later. The detection position of the pedestrian 63c is on the left side of the display region 62. The controller 33 may determine that there is no possibility of contact between the moving body 50 and the pedestrian 63c. In this case, the controller 33 does not need to display the fifth marker corresponding to the pedestrian 63c.

Figure 11:
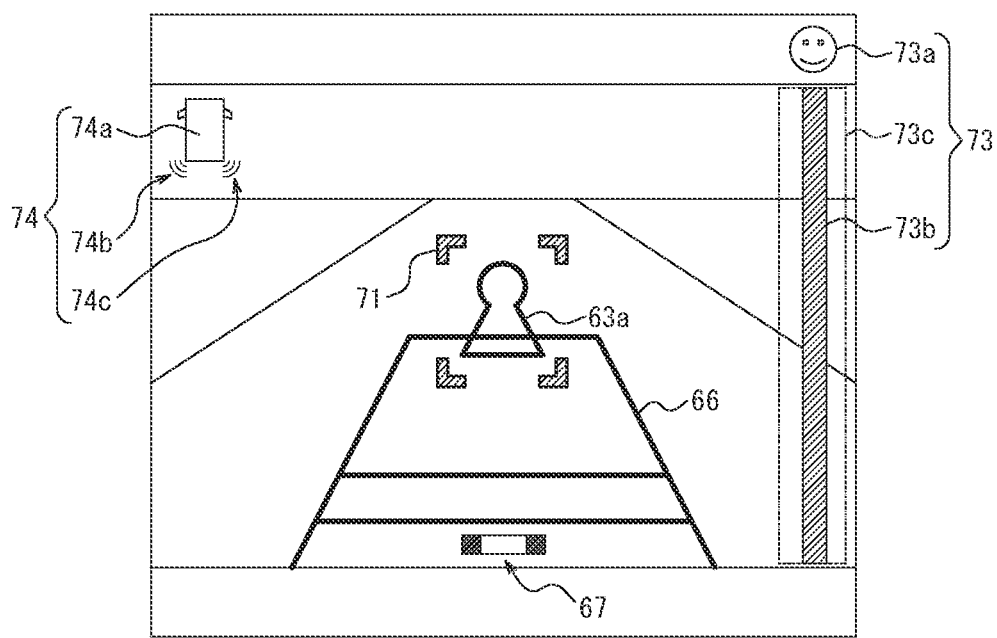
FIG. 11 is a diagram illustrating a second example of the second video image corresponding to a display region of the first video image of FIG. 10.

FIG. 11 illustrates an example of the second video image corresponding to the display region 62 of the first video image illustrated in FIG. 10. As illustrated in FIG. 11, the pedestrians 63a is displayed in the second video image. The pedestrians 63b and 63c are not displayed in the second video image.

The controller 33 may cause, for example, an obstacle image 74 to be superimposed on the second video images and displayed on the display apparatus 40 as illustrated in FIG. 11. The obstacle image 74 indicates a detection result of an obstacle detection apparatus provided to the moving body 50 that uses ultrasonic sonar or the like. The obstacle image 74 may include an image 74a, an image 74b, and an image 74c. The image 74a is an image of the moving body 50 viewed from above. The image 74b is an image indicating that an obstacle is detected on the left rear side of the moving body 50. The image 74c is an image indicating that an obstacle is detected on the right rear side of the moving body 50. The detection result of the obstacle detection apparatus and a detection result of the detection object of the controller 33 may not necessarily coincide. In the example illustrated in FIG. 11, for example, the obstacle image 74 indicates that obstacles are detected on both the right rear side and the left rear side of the moving body 50. On the other hand, the controller 33 may determine that there is no possibility of contact between the moving body 50 and the pedestrian 63c on the left rear side of the moving body 50. In this case, the controller 33 does not need to display the fifth marker corresponding to the pedestrian 63c.

FIG. 11 illustrates an example of a fifth marker 73 corresponding to the pedestrian 63b. The fifth marker 73 may include an icon image 73a and a band image 73b. The icon image 73a may be an image corresponding to a "person" as the type of the detection object. The icon image 73a enables the subject 60 to recognize that there is a person on the right side of the second video image. The band image 73b is, for example, an image of a band that extends in the up-down direction in the second video image. The band image 73b may be filled with color or a pattern corresponding to the "person" as the type of the detection object. The controller 33 may move the band image 73b within a right-side edge region 73c of the second video image. The controller 33 may change a moving speed and a width of the band image 73b.

The fifth marker 73 will be described in detail. The controller 33 may determine the width of the band image 73b on the basis of the distance between the moving body 50 and the pedestrian 73b. For example, the controller 33b may increase the width of the band image 73b as the distance becomes smaller. The band image 73b enables the subject 60 to recognize the distance between the moving body 50 and the pedestrian 63b on the basis of the width of the band image 73b.

The controller 33 may determine that the moving body 50 contributes more to the reduction of the distance between the moving body 50 and the pedestrian 63b. In this case, the controller 33 repeatedly moves the band image 73b in a first direction within the right-side edge region 73c of the second video image. The first direction may be, for example, a direction directing from the outside to the inside in the left-right direction of the second video image. The controller 33 may determine that the pedestrian 63b contributes more to the reduction of the distance between the moving body 50 and the pedestrian 63b. In this case, the controller 33 repeatedly moves the band image 73b in a second direction within the right-side edge region 73c of the second video image. The second direction may be, for example, a direction directing from the inside to the outside in the left-right direction of the second video image. The band image 73b enables the subject 60 to know whether the moving body 50 is approaching the pedestrian 63b or the pedestrian 63b is approaching the moving body 50, on the basis of a moving direction of the band image 73b.

The controller 33 may determine the moving speed of the band image 73b on the basis of the rate at which the distance between the moving body 50 and the pedestrian 63b is decreasing. For example, the moving speed of the band image 73b may be faster as the rate at which the distance is decreasing is faster. The band image 73b enables the subject 60 to recognize the rate of decrease of the distance between the moving body 50 and the pedestrian 63b on the basis of the moving speed of the band image 73b.

Figure 12:
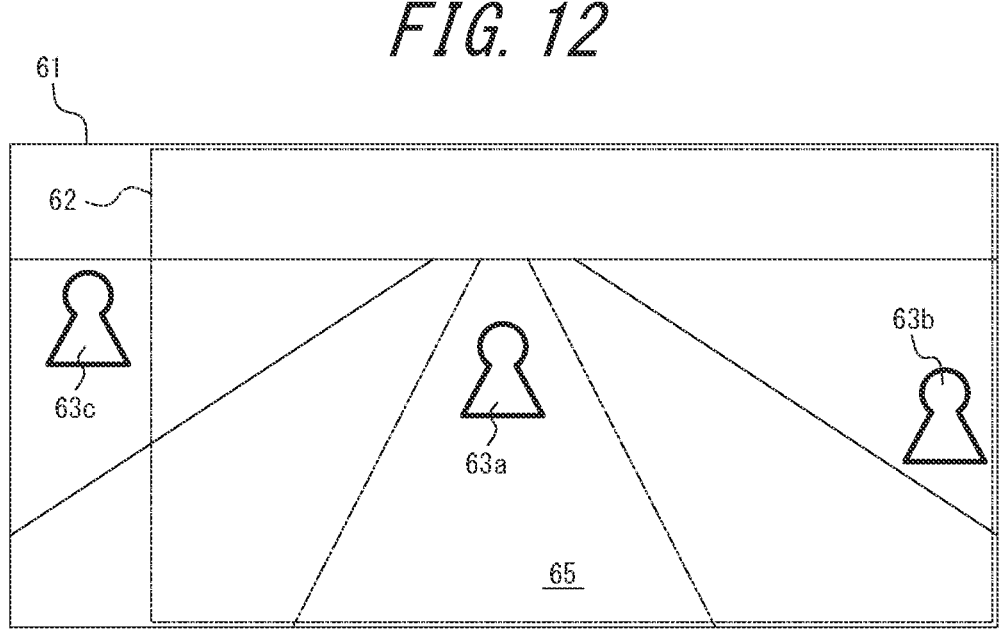
FIG. 12 is a diagram illustrating a third example of the first video image.

In a state in which the fifth marker 73 is displayed, when the controller 33 detects, for example, a user input corresponding to a predetermined user operation, the controller 33 may change the display region 62 to encompass the detection position of the pedestrian 63b in the first video image. For example, the controller 33 may extend the display region 62 of the first video image in the left-right direction and shift the display region 62 to the right in the detection region 61 as illustrated in FIG. 12. This configuration includes the pedestrian 63b in the second video image as illustrated in FIG. 13 by way of example.

The predetermined user operation described above may include any appropriate user operation. For example, the predetermined user operation described above may include a first user operation for changing a steering angle of the steering wheel of the moving body 50. The fifth marker 73 may function as a GUI (Graphic User Interface) configured to receive a second user operation. Hereinafter, the GUI will also be referred to as an interface image. In this case, the predetermined user operation described above may include the second user operation.

The controller 33 may autonomously change the display region 62 such that the detection position of the pedestrian 63b in the first video image is included in the display region 62. In this case, the controller 33 may maintain the autonomous change of the display region 62 until the pedestrian 63b stops being detected in the detection region 61 of the first video image.

Figure 13:
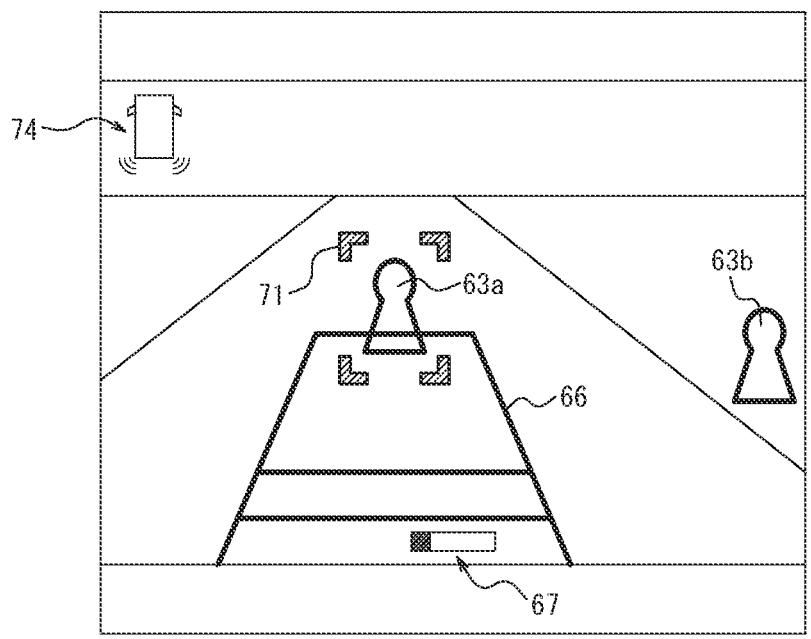
FIG. 13 is a diagram illustrating a third example of the second video image corresponding to a display region of the first video image of FIG. 12.

The controller 33 may change the icon image 67 on the basis of the change of the display region 62 as illustrated in FIG. 13 by way of example.

Figure 14:
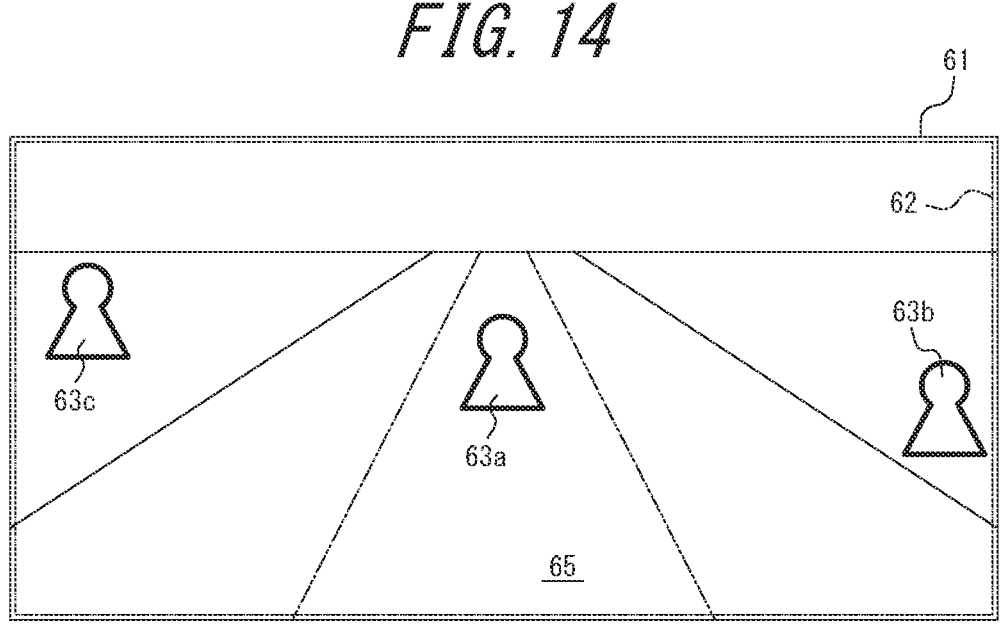
FIG. 14 is a diagram illustrating a fourth example of the first image.
Figure 15:
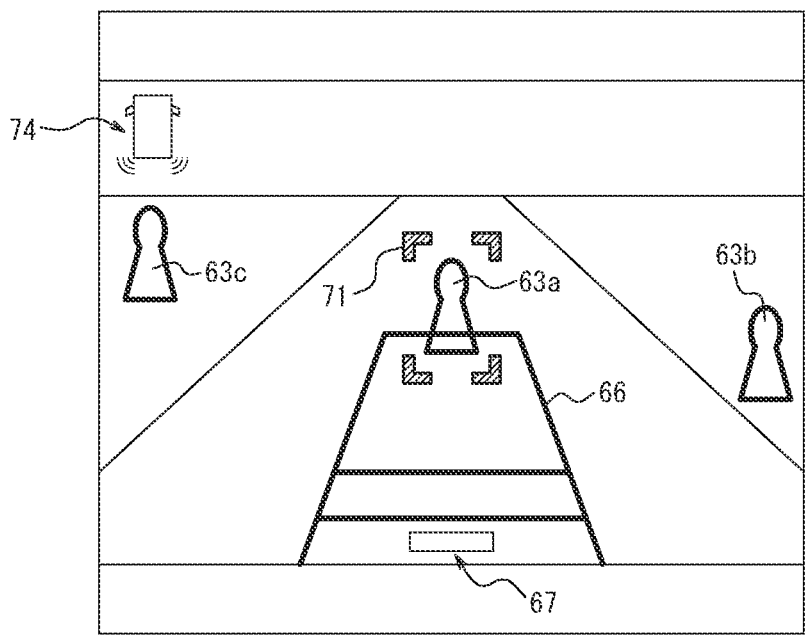
FIG. 15 is a diagram illustrating a fourth example of the second video image corresponding to a display region of the first video image of FIG. 14.

The controller 33 may change the display region 62 of the first video image on the basis of, for example, a pinch-in operation and a pinch-out operation of the display apparatus 40. For example, the controller 33 may substantially match the display region 62 with the detection region 61 as illustrated in FIG. 14. In this case, all detection objects in the detection region 61 are displayed on the display apparatus 40 as illustrated in FIG. 15 by way of example.

Fifth Example (Reference Example)

Figure 16:
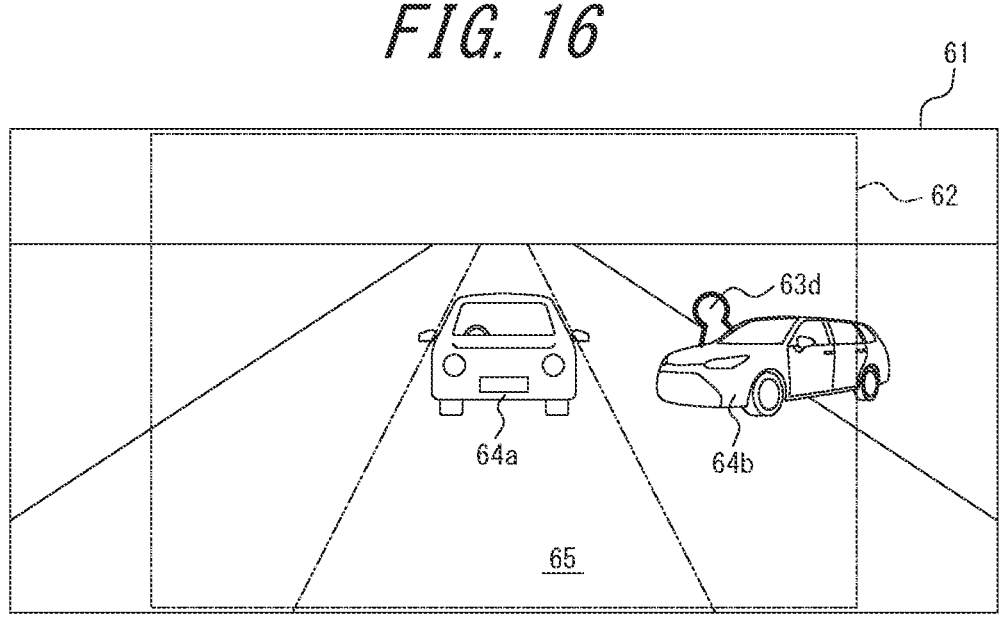
FIG. 16 is a diagram illustrating a fifth example of the first video image.

FIG. 16 illustrates a third example of the detection region 61 of the first video image acquired by the image processing apparatus 30 from the imaging apparatus 20. In the example illustrated in FIG. 16, the detection region 61 is longer in the left-right direction than the up-down direction. The display region 62 is positioned at the center of the left-right direction of the detection region 61. The controller 33 may detect each of a vehicle 64a indicated in the first predicted path 65 of the moving body 50 and a vehicle 64b and a pedestrian 63d indicated outside of the first predicted path 65.

In the fifth example, a case in which the outside area of the moving body 50 is dark, such as at night or inside a tunnel will be described. When the outside area of the moving body 50 is dark, characteristic values of the first video image and the second video image may decrease. The characteristic values may include any parameters associated with the visibility of the video image. For example, the characteristic values may include at least one of a luminance value and a contrast ratio of the video image. The decrease of the characteristic value of the second video images may lead to a deterioration in the visibility of the second video image.

The controller 33 may perform predetermined image processing on a region corresponding to the detection object in the second video images. The predetermined image processing may include first processing to superimpose a marker corresponding to a detection object on the region. Hereinafter, this marker will also be referred to as a sixth marker. The sixth marker may include, for example, an image substantially corresponding to an outline of the detection object in the second video images. In this configuration, the sixth marker is superimposed on the detection object in the second video images. This enables the subject 60 to easily recognize the detection object in the second video images even when the characteristic value of the second video images is low. The specific image processing may include second processing to change the characteristic value of the region corresponding to the detection object in the second video images. For example, the controller 33 may change the characteristic value of the region in such a manner so as to improve the visibility of the region in the second video images. This configuration improves the visibility of the detection object in the second video images. Thus, the subject 60 can easily recognize the detection object in the second video images even when the characteristic value of the second video images is low.

The controller 33 may perform the specific image processing described above when one or more conditions are met. The one or more conditions may include a condition specifying that the detection object is located in the first predicted path 65 of the moving body 50. The one or more conditions may include a condition specifying that the first predicted path 65 of the moving body 50 and the second predicted path of the detection object overlap with each other. The one or more conditions may include a condition specifying that the distance between the moving body 50 and the detection object is less than a predetermined threshold. The one or more conditions may include a condition specifying that the characteristic value of at least a portion of the second video images is less than a predetermined threshold.

Figure 17:
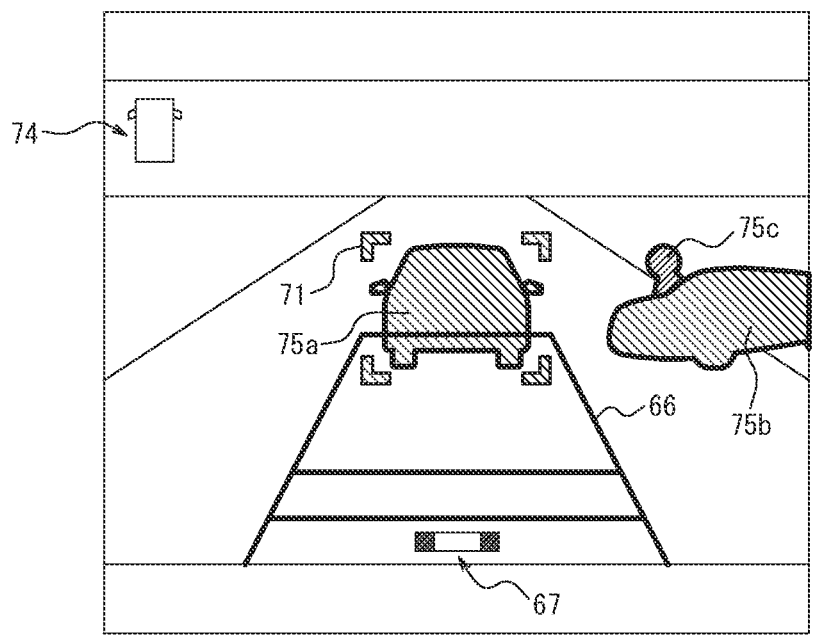
FIG. 17 is a diagram illustrating a fifth example of the second video image corresponding to a display region of the first video image of FIG. 16.

In the fifth example, the controller 33 may determine that the one or more conditions described above are met with respect to the vehicles 64a and 64b and the pedestrian 63d. In this case, the controller 33 may cause sixth markers 75a, 75b, and 75c corresponding to the vehicles 64a and 64b and the pedestrian 63d, respectively, to be superimposed on the second video image and displayed on the display apparatus 40 as illustrated in FIG. 17 by way of example. The controller 33 may display the sixth markers on the detection objects in an overlapping manner in bright locations.

Figure 18:
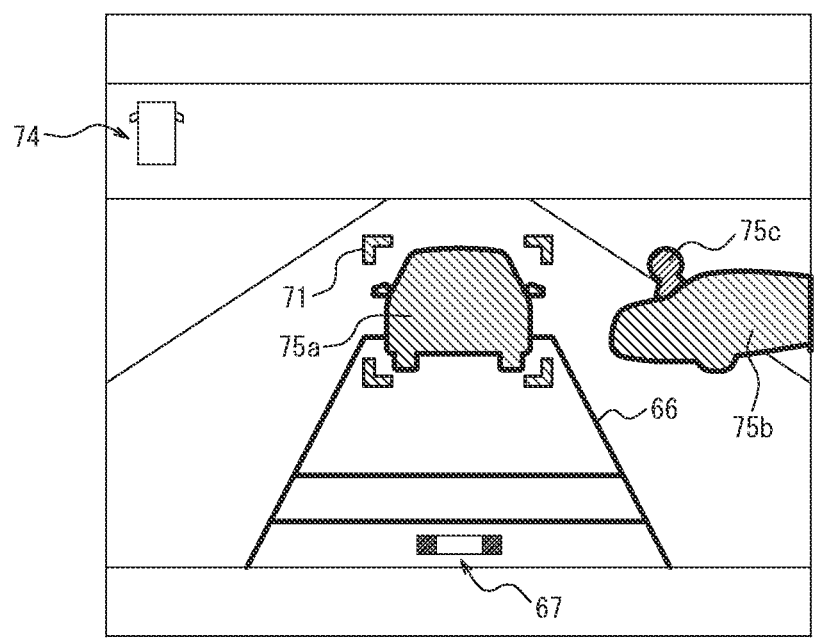
FIG. 18 is a diagram illustrating another example of the second video image corresponding to the display region of the first image of FIG. 16.

The controller 33 may change a shape of the guide lines 66. The controller 33 may change the shape of the guide lines 66 in a region where the guide lines 66 and the detection object overlap with each other. FIG. 18 illustrates an example of the shape of the guide lines 66. The guide lines 66 are not displayed in a region in which the guide lines 66 overlap the sixth marker 75a in FIG. 18. The shape of the guide lines 66 is not limited to such omission and may accommodate other design changes. Design changes includes changes of color, changes of transmittance, changes of line type such as a change to a broken line, or changes of line thickness, and flashing. The controller 33 may change the shape of the guide lines 66 when the sixth marker is not displayed. The controller 33 may change the shape of the guide lines 66 when the first marker 71 and the second marker 72 are displayed as the detection objects.

According to the display system 10 of the first embodiment as described above, a variety of markers corresponding to the detection objects detected in the first video image are superimposed on the second video image and displayed on the display apparatus 40. This configuration enables the subject 60 to recognize a relative positional relationship between the moving body 50 and the detection objects at a glance. Thus, the convenience of technologies for displaying video images of the outside area of the moving body 50 is improved.

Examples of various video images that are generated by the image processing apparatus 30 by synthesizing a guide wall image 80 and other images on the display region of the first video image and displayed on the display apparatus 40 will be described in detail below with reference to FIG. 19 to FIG. 31.

Sixth Embodiment

Figure 19:
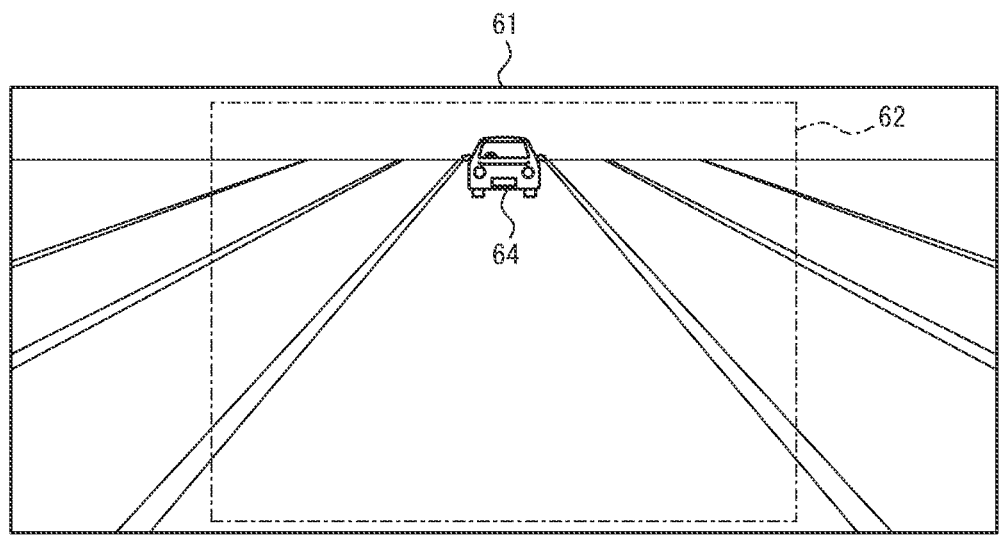
FIG. 19 is a diagram illustrating a sixth example of the first video image.

FIG. 19 illustrates a sixth example of the detection region 61 of the first video image acquired from the imaging apparatus 20 by the image processing apparatus 30. The imaging apparatus 20 may be arranged in such a manner as to capture a rear area behind a vehicle as the moving body 50. In the example illustrated in FIG. 19, the detection region 61 is longer in the left-right direction than the up-down direction. The display region 62 is positioned at the center of the left-right direction of the detection region 61. The detection region 61 is not limited to such a shape longer in the left-right direction than in the up-down direction and may have a variety of shapes including a square, a rectangle in portrait orientation, a round shape, and the like. The display region 62 may be arranged in a variety of positions and have a variety of sizes and shapes. For example, the display region is not limited to being positioned at the center of the detection region 61 and may be shifted to the left or right. The display region 62 is not limited to a portion of the detection region 61 and may cover the detection region 61 in its entirety. The controller 33 may change the display region 62 of the first video image in accordance with a pinch-in operation and a pinch-out operation in respect of the display apparatus 40.

The controller 33 generates the second image by synthesizing a guide wall image 80 (see FIG. 20) that indicates the first predicted path 65 of the moving body 50 in the display region of the first video images acquired from the imaging apparatus 20. The controller 33 may output images obtained by superimposing the guide wall image 80 on the second video images and cause the display apparatus 40 to display the images. The guide wall image 80 may indicate a predicted path when the moving body 50 moves rearward. The guide wall image 80 is a marker that presents a three-dimensional impression to the subject 60. The guide wall image 80 may be considered to be an image in which a virtual guide wall for guiding to a predicted path arranged in the real space of the first video image is mapped on the first video images captured by the imaging apparatus 20. The guide wall image 80 may be visually recognized as a plurality of virtual translucent wall surfaces that extend from the road surface to a predetermined height in the height direction within the field of view of the subject 60. The guide wall image 80 can be considered to be a three-dimensional display of guide lines formed as walls displayed on the display apparatus 40 when the vehicle moves rearward. The display of the walls may include other modes such as surfaces, films, plates, and the like. The three-dimensional display of the guide wall image 80 enables the subject 60 to easily recognize a location of a parking space on the road, a distance to an obstacle, and the like.

The controller 33 can recognize a detection object in the display region 62 of the first video images. The controller 33 can detect the detection object located in the first predicted path 56 in the display region 62 of the first video images. When the detection object is detected, the controller 33 can synthesize a first recognition wall image 83 as a virtual plane on a detection object side of the moving body 50. The first recognition wall image 83 moves together with the detection object when the detection object moves.

Figure 20:
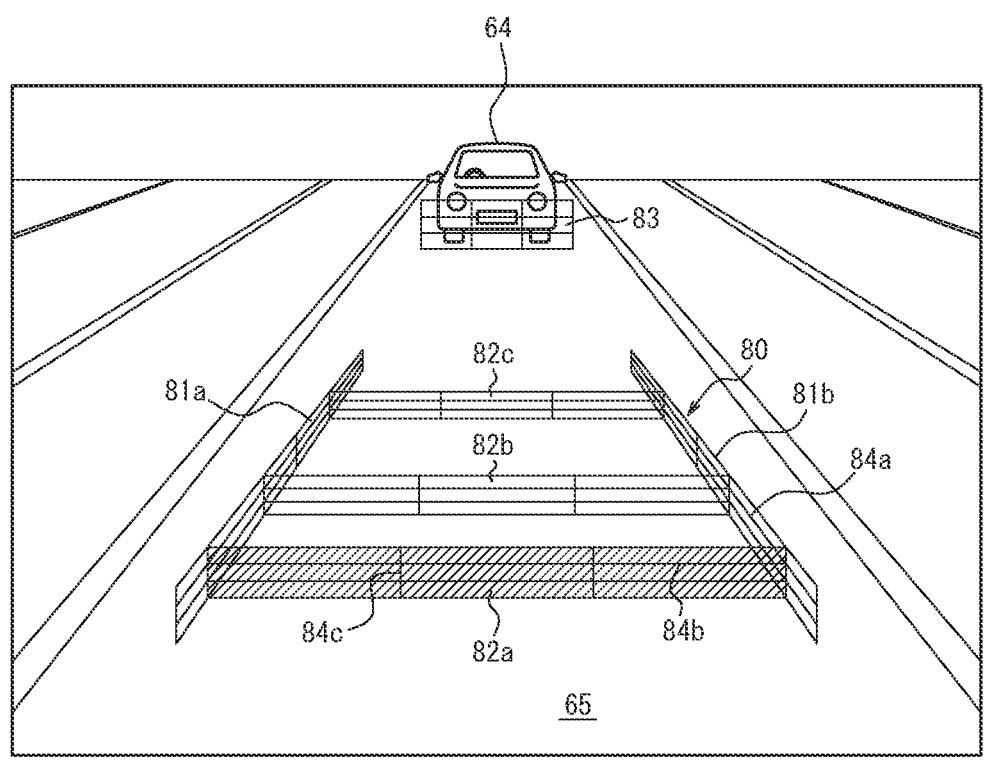
FIG. 20 is a diagram illustrating a sixth example of the second video image corresponding to a display region of the first video image of FIG. 19.

FIG. 20 illustrates an example of a second video image corresponding to the display region 62 of the first video image illustrated in FIG. 19. The guide wall image 80 is arranged spaced apart upward from the bottom edge of the second video image. The guide wall image 80 may include two sidewall images 81a and 81b that extend in the upward direction and the depth direction. The sidewall image 81a is positioned on the left side in the horizontal direction, and the sidewall image 81b is positioned on the right side in the horizontal direction. A region between the sidewall image 81a and the sidewall image 81b indicates the first predicted path 65 which the vehicle as the moving body 50 is expected to follow. The space between the sidewall image 81a and the sidewall image 81b may be set to indicate the width of the moving body 50. The sidewall images 81a and 81b are linear in FIG. 20. The controller 33 may acquire the moving body information from the communication interface 31 and curve the sidewall images 81a and 81b on the basis of the predicted path. In this case, the moving body information includes a steering angle of the steering wheel.

The guide wall image 80 may include a plurality of distance wall images 82a, 82b, and 82c that extend in the height direction and the horizontal direction and indicate the respective depth direction distances from the moving body 50. The distance wall images 82a, 82b, and 82c may connect the sidewall images 81a and 81b together. FIG. 20 illustrates the three distance wall images 82a, 82b, and 82c. The number of distance wall images is not limited to three and may be two or more than three. A depth-direction space between the distance wall image 82a and the distance wall image 82b may be smaller than a depth-direction space between the distance wall image 82b and the distance wall image 82c. The height-direction length of the distance wall images 82a, 82b, and 82c may be either longer or shorter than the height-direction lengths of the sidewall images 81a and 81b.

A frame may be displayed on an outer periphery of each of the sidewall images 81a and 81b and each of the distance wall images 82a, 82b, and 82c of the guide wall image 80. The guide wall image 80 may include at least one of an auxiliary line 84a that extends in the depth direction, an auxiliary line 84b that extends in the horizontal direction, and an auxiliary line 84c that extends in the height direction. The guide wall image 80 may include all of the auxiliary line 84a that extends in the depth direction, the auxiliary line 84b that extends in the horizontal direction, and the auxiliary line 84c that extends in the height direction. The auxiliary line 84a that extends in the depth direction may be displayed on the sidewall images 81a and 81b. The auxiliary line 84b that extends in the horizontal direction may be displayed on the distance wall images 82a, 82b, and 82c. The auxiliary line 84c that extends in the height direction may be displayed on the sidewall images 81a and 81b and the distance wall images 82a, 82b, and 82c. Each of the auxiliary lines 84a, 84b, and 84c may be in any appropriate number. When a plurality of lines of each of the auxiliary lines 84a, 84b, and 84c are provided, each of the auxiliary lines 84a, 84b, and 84c have equal spaces therebetween. The space between each of the plurality of auxiliary lines 84a, 84b, and 84c may be varied according to conditions such as a height from the road surface, a distance from the moving body 50, and the like. The frame displayed on the outer periphery of each of the sidewall images 81a and 81b and the distance wall images 82a, 82b, and 82c may be considered as a portion of each of the plurality of auxiliary lines 84a, 84b, and 84c. When a plurality of lines of each of the auxiliary lines 84a, 84b, and 84c are provided, only one of them is appropriately denoted by the corresponding reference sign in FIG. 20 and other diagrams described below.

When the distance wall image 82a is mapped in the real space captured in the first video images, the distance wall image 82a serves as a first distance wall image that is located closer to the moving body 50 than the wall images 82b and 82c. The distance wall image 82a may be in different color from the colors of the distance wall images 82b and 82c. For example, the distance wall images 82b and 82c may be in translucent white, and the distance wall image 82a may be in translucent red. The sidewall images 81a and 81b may be in translucent white. The color described above are set by way of example, and the sidewall images 81a and 81b may be in color different from the colors of the distance wall images 82b and 82c.

The transmittances of the sidewall images 81a and 81b may be varied in the depth direction. The transmittances of the sidewall images 81a and 81b may be set to increase from the front side to the rear side in the depth direction. The color saturation and brightness of the sidewall images 81a and 81b may be varied in the depth direction. For example, the color saturation may decrease from the front side in the depth direction. The color saturation may also be referred to as color density. The sequential transition of the transmittance, color saturation, brightness, and chromaticity can be said to be gradation.

The transmittance of each of the distance wall images 82a, 82b, and 82c may be varied in accordance with the height from the road surface. The transmittance of each of the distance wall images 82a, 82b, and 82c may be set to increase as the height from the road surface in the height direction increases. The color saturation or the brightness of each of the distance wall images 82a, 82b, and 82c may be varied in accordance with the height from the road surface. For example, the color saturation may decrease as the height from the road surface increases.

The auxiliary lines 84b and 84c on the distance wall image 82a serving as the first distance wall image may be in the same color as the auxiliary lines 84b and 84c of the distance wall images 82b and 82c. The auxiliary lines 84a, 84b, and 84c may be in any color. For example, when the wall surfaces of the guide wall image 80 except for the distance wall image 82a are in white, the auxiliary lines 84a, 84b, and 84c may be in white having the brightness higher than the wall surfaces or having the transmittance lower than the wall surfaces.

The controller 33 may detect the vehicle 64 displayed in the display region 62 of the first video images as the detection object. In the example of FIG. 20, the vehicle 64 is located within the first predicted path 65. The detection object detected by the controller 33 is not limited to a vehicle and may include, for example, a building, a fence, an obstacle on the road, a person, an animal, and the like. When the controller 33 detects a detection object, the controller 33 can synthesize the first recognition wall image 83 on a detection object side of the moving body 50. When the controller 33 detects a detection object, the controller 33 may change the height-direction length of the guide wall image 80. When the controller 33 detects a detection object, the controller 33 may reduce the height-direction length of the guide wall image 80. In this way, the controller 33 can clarify the display when the first recognition wall image 83 is displayed and draw attention of the subject 60 to the detection object.

The first recognition wall image 83 of the detection object located within the first predicted path 65 extends in the height direction and the horizontal direction. The first recognition wall image 83 may be displayed as an opaque or translucent surface in any color. In FIG. 20, the first recognition wall image 83 is displayed as a translucent rectangle surface positioned on the side of the vehicle 64 opposing to the moving body 50. The horizontal direction width of the first recognition wall image 83 may match the width of the vehicle 64. The horizontal direction width of the first recognition wall image 83 may substantially match the width of the vehicle 64. The height of the first recognition wall image 83 may be set to a predetermined value. The transmittance of the first recognition wall image 83 may be varied in accordance with the height from the road surface. The transmittance of the first recognition wall image 83 may be set to increase as the height from the road surface increases. The color saturation or the brightness of the first recognition wall image 83 may be varied in accordance with the distance from the road surface in the height direction. For example, the color saturation may decrease as the distance from the road surface in the height direction increases. The first recognition wall image 83 may include auxiliary lines that extend in the horizontal direction and the height direction.

The controller 33 may shift the auxiliary lines of the first recognition wall image 83, which extend in the horizontal direction, in the height direction within the frame of the first recognition wall image 83. The auxiliary lines may be displayed in such a manner as to appear from the bottom edge region of the frame of the first recognition wall image 83 and vanish at the top edge region of the frame. The controller 33 may display both of or any one of a relative position of the moving body 50 and the vehicle 64 and a change of a relative distance therebetween by shifting, in the height direction, the auxiliary line of the first recognition wall image 83 that extends in the horizontal direction. For example, when the distance between the moving body 50 and the vehicle 64 is decreasing, the controller 33 may shift, in the height direction, the auxiliary line that extends in the left-right direction at a high speed. The controller 33 may shift the auxiliary line in the height direction faster as the distance between the moving body 50 and the vehicle 64 is shorter. The controller 33 may shift, in the height direction, the auxiliary line of the first recognition wall image 83 that extends in the horizontal direction regardless of the location of, and the distance from, the detection object.

The color of the first recognition wall image 83 may be varied in accordance with the depth direction distance between the moving body 50 and the vehicle 64. For example, when the distance between the moving body 50 and the vehicle 64 is longer than a predetermined distance as illustrated in FIG. 20, the controller 33 may display the first recognition wall image 83 in blue. When the moving body 50 moves rearward reducing the distance to the vehicle 64, the controller 33 may change the color of the first recognition wall image 83 from blue to yellow and then to red.

When the distance between the moving body 50 and the vehicle 64 is longer than the predetermined distance, the controller 33 does not need to display the first recognition wall image 83. When the moving body 50 and the vehicle 64 relatively approach each other and the distance therebetween reaches the predetermined distance, the controller 33 displays the first recognition wall image 83 after, for example, highlighting the vehicle 64 in the second video image. Such highlighting includes displaying the outline of the vehicle 64 in bold lines, flashing the outline of the vehicle 64, painting the image of the vehicle 64, or the like. The controller 33 may change the display mode in accordance with a change in the relative position with respect to the vehicle 64. For example, when the vehicle 64 relatively moves away from the moving body 50, the first recognition wall image 83 does not need to be displayed.

Figure 21:
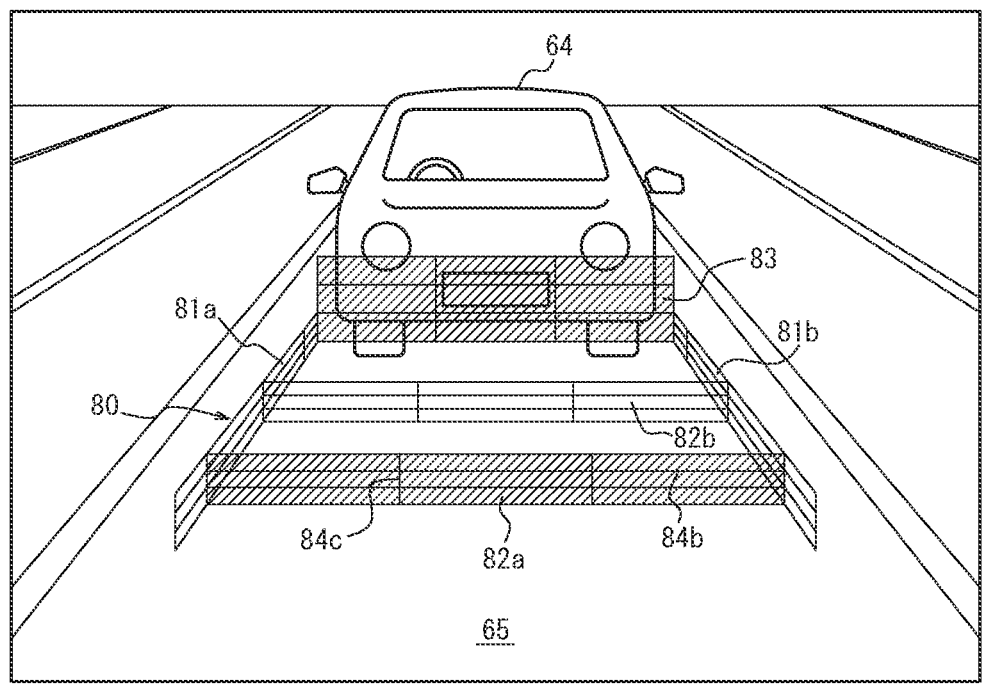
FIG. 21 is a diagram illustrating another example of the second video image.

FIG. 21 is a diagram illustrating an example of the second video image in a state in which the distance between the moving body 50 and the vehicle 64 decreases when the moving body 50 moves rearward. The first recognition wall image 83 is displayed in red. Thus, the subject 60 can be warned about the risk that further rearward movement may lead to collision with the vehicle 64.

When the detection object and the guide wall image 80 overlap with each other, the controller 33 may change the display of the guide wall image 80. For example, the controller 33 may hide at least a portion of the guide wall image 80 that overlaps with the vehicle 64 in the second video image as illustrated in FIG. 21. In particular, the controller 33 does not display, in the display apparatus 40, the portion of the guide wall image 80 that overlaps with the vehicle 64 and positioned remote from the moving body 50 in the depth direction from the vehicle 64 or the first recognition wall image 83. Thus, the display apparatus 40 can display a simple and intuitive image to the subject 60. The manner in which the display of the guide wall image 80 is changed is not limited to hiding an overlapping portion. For example, the controller 33 may increase the transmittance of the portion of the guide wall image 80 which overlaps with the detection object.

Example Variations

Figure 22:
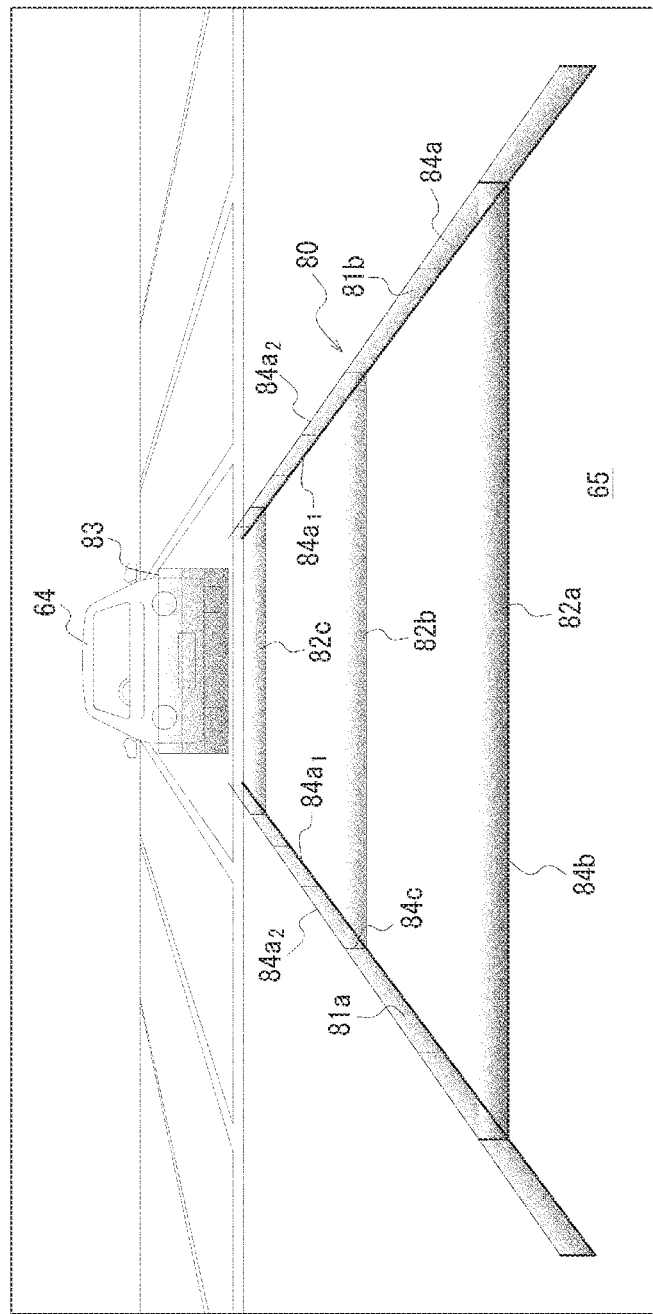
FIG. 22 is a diagram illustrating a first example variation of the sixth example of the second video image.
Figure 23:
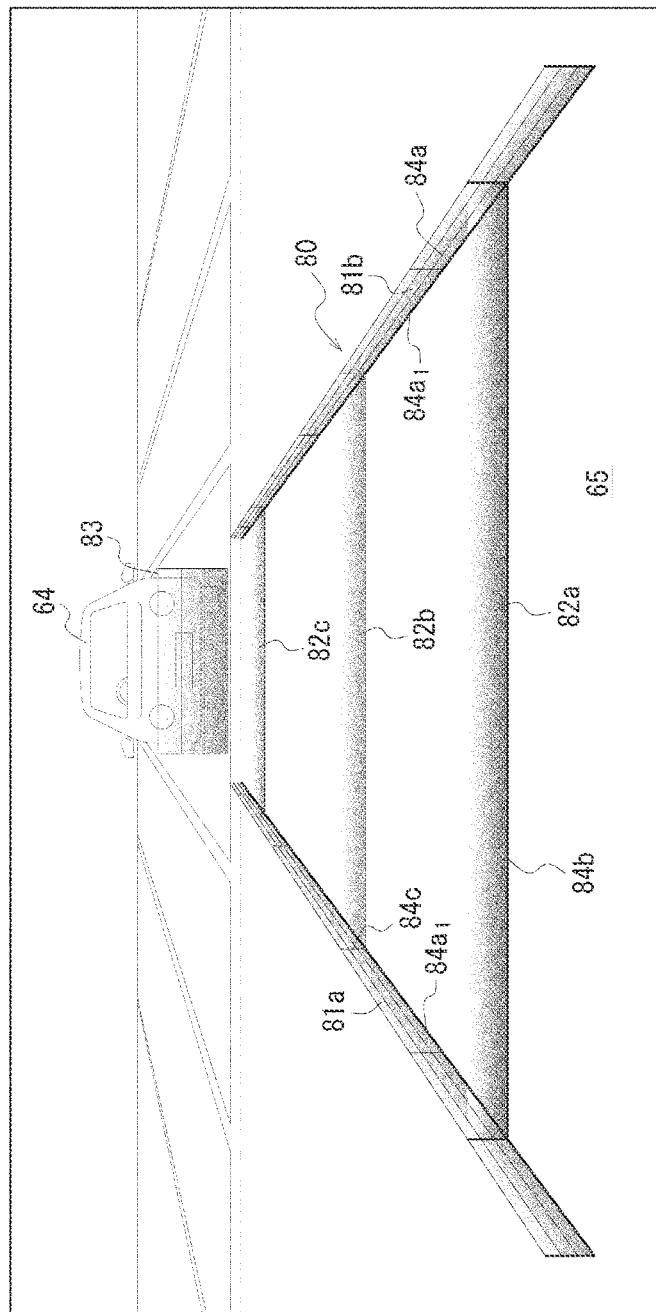
FIG. 23 is a diagram illustrating a second example variation of the sixth example of the second video image.
Figure 24:
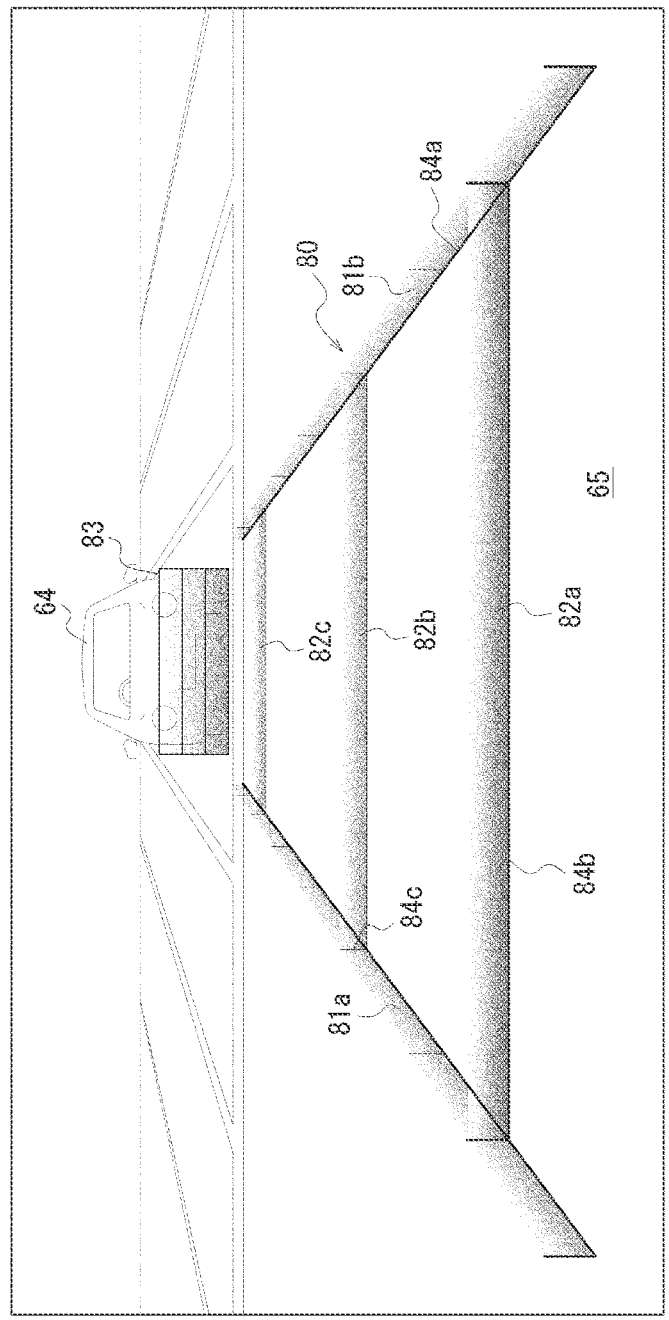
FIG. 24 is a diagram illustrating a third example variation of the sixth example of the second video image.

The guide wall image 80 is not limited to the examples illustrated in FIG. 20 and FIG. 21. FIG. 22 to FIG. 24 illustrate example variations of the guide wall image 80.

First Example Variation

In an example illustrated in FIG. 22, one of the auxiliary lines 84b of each of the distance wall images 82a, 82b, and 82c that extends in the horizontal direction and is positioned lowest in the height direction may be displayed. The distance wall image 82a that includes the auxiliary line 84b in the lowest position alone can enable easy recognition of the height from the ground surface. The distance wall image 82a that includes the auxiliary line 84b in the lowest position alone can enable easy recognition of the distance from the recognition wall image. At each end of the distance wall images 82a, 82b, and 82c in the horizontal direction, an auxiliary line 84c that extends in the height direction may be displayed. On each of the outer peripheries of the distance wall images 82a, 82b, and 82c, the auxiliary line 84b positioned at the bottom and the auxiliary lines 84c that are positioned at the horizontal ends and extends in the height direction at the left-right direction ends may be displayed. Each of the distance wall images 82a, 82b, and 82c may be displayed by the auxiliary line 84b that extends in the horizontal direction at the bottom of the outer periphery and the auxiliary lines 84c that extend in the height direction at the left-right direction ends.

Each of the distance wall images 82a, 82b, and 82c may include a semi-transparent surface. Each of the distance wall images 82a, 82b, and 82c may have the transmittance that increases, or a color saturation that decreases, moving away from the road surface in the height direction. The auxiliary lines 84b and 84c positioned on the outer periphery of the distance wall image 82a closest to the moving body 50 may be displayed in color different from the other auxiliary lines. For example, the auxiliary lines 84b and 84c may be red. The other auxiliary lines may be, but are not limited to, white. The first recognition wall image 83 displayed in front of the vehicle 64 may be displayed as a semitransparent surface in any color such that the transmittance increases or the color saturation decreases moving away from the road surface in the height direction. The top edge boundary of the first recognition wall image 83 may be hidden such that the first recognition wall image 83 is displayed to gradually vanish in the height direction.

In the example illustrated in FIG. 22, two auxiliary lines 84a extending in the depth direction of the side wall images 81a and 81b of the guide wall image 80 at the top and bottom thereof are displayed. Auxiliary lines $84a_1$ positioned at the bottom may be displayed to standout more than auxiliary lines $84a_2$ positioned at the top. To make the line stand out, a bold line, a line with lower transmittance, a brighter line and the like may be used. The auxiliary lines $84a_2$ positioned at the top and the auxiliary lines $84a_1$ positioned at the bottom may be displayed by the lines in the same display mode. The lines in the same display mode include lines having similar thicknesses, transmittances, brightnesses, and the like.

Each of the auxiliary line 84a extending in the depth direction may be displayed so as to become gradually paler and vanish at the farthest position in the depth direction. The side wall images 81a and 81b may be displayed in such a manner that the edge regions thereof at the farthest position in the depth direction are visible.

The auxiliary lines 84c of the side wall images 81a and 81b extending in the height direction may be displayed at least at the edge regions of the most front side and positions intersecting with the distance wall images 82a, 82b, and 82c. These auxiliary lines 84c extending in the height direction may be displayed to standout more than other auxiliary lines 84c extending in the height direction. The auxiliary lines 84c extending in the height direction may have different thicknesses. Among the auxiliary lines 84c, the auxiliary lines 84c displayed at the intersections with the distance wall image 82a may be bolder than the auxiliary lines 84c displayed at the intersections with the distance wall images 82b and 82c.

Second Example Variation

The guide wall image 80 illustrated in FIG. 23 is different from the guide wall image 80 of FIG. 22 with respect to the side wall images 81a and 81b. In FIG. 23, at least two auxiliary lines 84a positioned at the top and bottom extending in the depth directions of the side wall images 81a and 81b of the guide wall image 80 may be displayed. Among the auxiliary lines 84a extending in the depth direction, the one positioned lowermost in the height direction may be displayed to standout more than the others. A plurality of auxiliary lines 84a may be displayed by the lines in the same display mode. The guide wall image 80 of FIG. 23 may employ the variations in transmittance, color, and color arrangement that may be employed by the guide wall image 80 of FIG. 22.

Third Example Variation

The guide wall image 80 illustrated in FIG. 24 is different from the guide wall image 80 of FIG. 22 with respect to the side wall images 81a and 81b. In FIG. 24, the auxiliary lines 84a of the side wall images 81a and 81b of the guide wall image 80 that extend in the depth direction and positioned on the bottom are displayed. The auxiliary lines 84a of the guide wall image 80 that extend in the depth direction and positioned on the bottom may correspond to lines on the road surface mapped to the real space captured in the first video images together with the auxiliary lines 84b extending in the horizontal direction. The guide wall image 80 of FIG. 24 may employ the variations in transmittance, color, and color arrangement that may be employed by the guide wall image 80 of FIG. 22. The auxiliary lines 84c extending in the height direction may have different thicknesses. The thicknesses of the auxiliary lines 84c arranged from the front side in the depth direction may decrease in the depth direction.

In the guide wall image 80 illustrated in each of FIG. 20 to FIG. 24, the display apparatus 40 may omit some or all of the auxiliary lines 84a, 84b, and 84c.

Seventh Example

Figure 25:
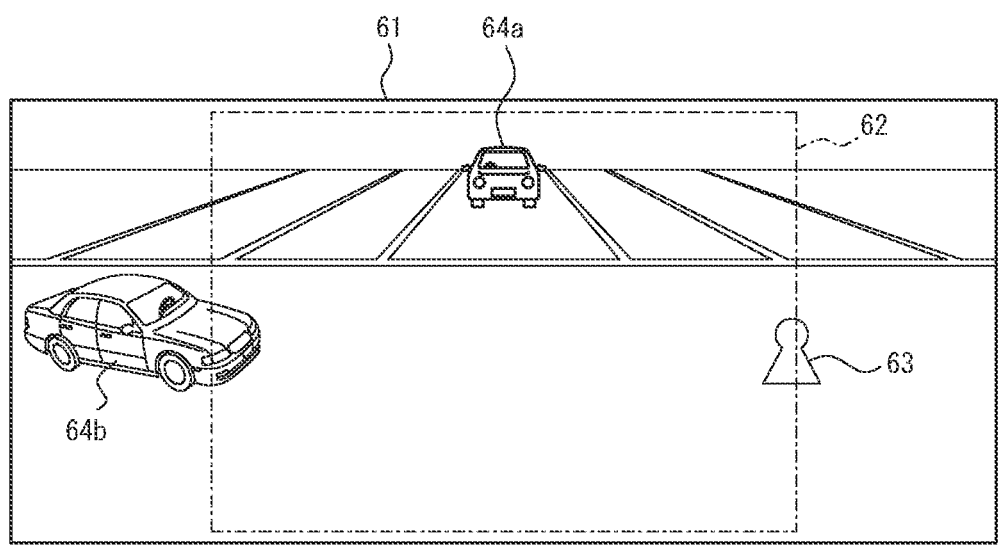
FIG. 25 is a diagram illustrating a seventh example of the first video image.

FIG. 25 illustrates a seventh example of the detection region 61 of the first video image obtained by the image processing apparatus 30 from the imaging apparatus 20. In the example illustrated in FIG. 25, the detection region 61 is longer in the left-right direction than the up-down direction. The display region 62 is positioned at the center of the left-right direction of the detection region 61. The display region 62 is not limited to a portion of the detection region 61 and may cover the detection region 61 in its entirety.

In the seventh example, the moving body 50 is a vehicle moving rearward toward a parking space in a parking lot. The imaging apparatus 20 may be positioned on the rear side of the moving body 50 and capture a rear area behind the moving body 50. The controller 33 may detect, from the detection region 61, each of the vehicle 64b and the pedestrian 63 displayed at least partially in the display region 62 outside of the first predicted path 65 and inside of the display region 62 as detection objects. In the example illustrated in FIG. 25, the controller 33 determines that the vehicle 64a in the first predicted path 65 of the moving body 50 is located farther than a predetermined depth direction distance and thus does not treat the vehicle 64a as the detection object.

Figure 26:
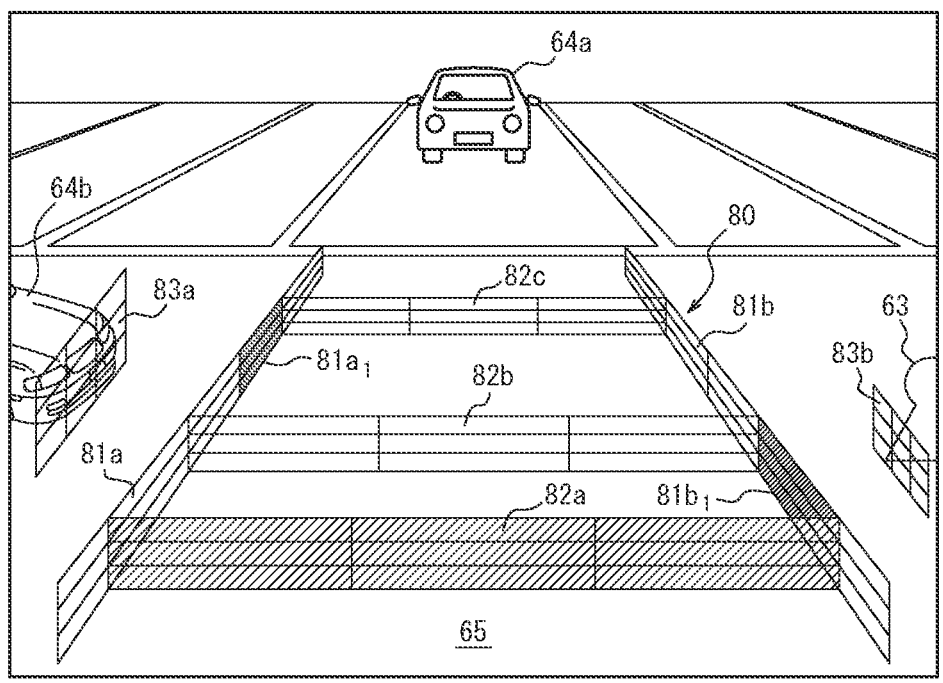
FIG. 26 is a diagram illustrating a seventh example of the second video image corresponding to a display region of the first video image of FIG. 25.

FIG. 26 illustrates an example of the second video image corresponding to the display region 62 of the first video image illustrated in FIG. 25. The controller 33 recognizes the vehicle 64b and the pedestrian 63 as the detection objects located inside of the display region 62 of the first video image and displays the first recognition wall images 83a and 83b configured as virtual flat planes on the portions of the vehicle 64b and the pedestrian 63 opposing to the moving body 50. Each of the first recognition wall images 83a and 83b may be displayed as a translucent planes parallel to the side wall images 81a and 81b extending in the height direction and the depth direction. The controller 33 may acquire changes in the distances between the relative positions of the vehicle 64b and the moving body 50 and between the relative positions of the pedestrian 63 and the moving body 50 and display the side wall images 81a and 81b when the relative positions change in a direction reducing the distance. In a manner similar to the above, any appropriate algorithm may be employed for the estimation of the distance between the moving body 50 and the detection objects.

The controller 33 may estimate the horizontal direction distances between the vehicle 64a and the pedestrian 63 as the detection objects and the guide wall image 80 and determine the colors of the first recognition wall images 83a and 83b on the basis of the estimated distances. Here, the distances between the detection objects and the guide wall image 80 refers to distances between the detection objects and a virtual guide wall displaying the guide wall image 80 that is assumed to be present in the real space in the first video image. The controller 33 may estimate the first distance between positions of the detection objects and the position of the guide wall image 80 on the basis of a position in which the guide wall image 80 is mapped in the real space captured in the first video image and the positions of the detection objects. The controller 33 may provide a threshold of the first distance and cause the display apparatus 40 to display each of the first recognition wall images 83a and 83b in different colors such as blue, yellow, red, or the like in the stated order from one with a longer horizontal direction distance. Each of the first recognition wall images 83a and 83b may include an auxiliary line that extends in the depth direction. The controller 33 may shift the auxiliary lines of the first recognition wall images 83a and 83b, which extend in the depth direction, in the height direction within the frame of the first recognition wall image 83 in a manner similar to the auxiliary lines of the first recognition wall image 83 of FIG. 20 that extend in the horizontal direction.

The controller 33 estimates first positions as the depth direction locations of the vehicle 64b and the pedestrian 63 as the detection objects. The controller 33 may at least partially change the display of the side wall images 81a and 81b opposing the vehicle 64b and the pedestrian 63 in correspondence with the first positions. The change in the display mode includes a change of color of the wall surface, brightness, color saturation, color or thickness of the frame and/or auxiliary line, or any combination thereof. For example, colors of a portion 81a1 of the side wall image 81a opposing the vehicle 64b and a portion 81b1 of the side wall image 81b opposing the pedestrian 63 are changed in FIG. 26. The portions of the side wall images 81a and 81b may correspond to regions defined by the auxiliary lines 84c of the side wall images 81a and 81b that extend in the height direction. The colors of the portions 81a1 and 81b1 of the side wall images 81a and 81b may be varied on the basis of the first distance. When the detection object is a large obstacle relative to the length indicated by the side wall images 81a and 81b, the controller 33 may change the colors of the side wall image 81a or the side wall image 81b in its entirety. Such a large obstacle may include a large vehicle such as a trailer, building, or the like.

When the detection object moves, the controller 33 may estimate the second predicted path of the detection object and estimate the first position as a position at which the second predicted path and the side wall images 81a and 81b intersect with one another. The controller 33 may estimate the first position as a position at which the second predicted path in the real space captured in the first video images and the side wall images 81a and 81b mapped to the real space intersect with one another. The controller 33 may change the display of the side wall images 81a and 81b at least partially on the basis of the first position. In this case also, the colors of the portions 81a1 and 81b1 of the side wall images 81a and 81b may be changed on the basis of the first distance. When the detection object is a very large obstacle, the controller 33 may change the colors of the side wall image 81a or the side wall image 81b in their entirety.

In another display mode, the controller 33 may change the display of portions of the side wall images 81a and 81b positioned farther in the depth direction from the first recognition wall images 83a and 83b. In yet another display mode, the controller 33 may change the display of portions of the side wall images 81a and 81b positioned farther in the depth direction from positions where the second predicted paths and the side wall images 81a and 81b intersect with one another.

The display of the first recognition wall images 83a and 83b may be changed on the basis of their heights from the road surface. The transmittance, color saturation, brightness and the like of the first recognition wall images 83a and 83b may be varied on the basis of the heights thereof from the road surface, in a manner similar to the first recognition wall image 83 of the sixth example.

As described above, the display system 10 can spatially display the distance to and/or location of a detection object that can be an obstruction to the rearward movement in a three-dimensional manner by using the guide wall image 80 and the first recognition wall images 83*a* and 83*b*. Also, from the predicated path of the detection object in motion, a position where there is a risk of collision may be displayed in a three-dimensional manner. As described above, the display system 10 can spatially display a detection object and warning content in a three-dimensional manner by displaying each of the guide wall image 80 and the first recognition wall images 83*a* and 83*b* as a wall (or a plane) having a height. Thus, the subject 60 can easily recognize the display and the warning content.

Eighth Example

Figure 27:
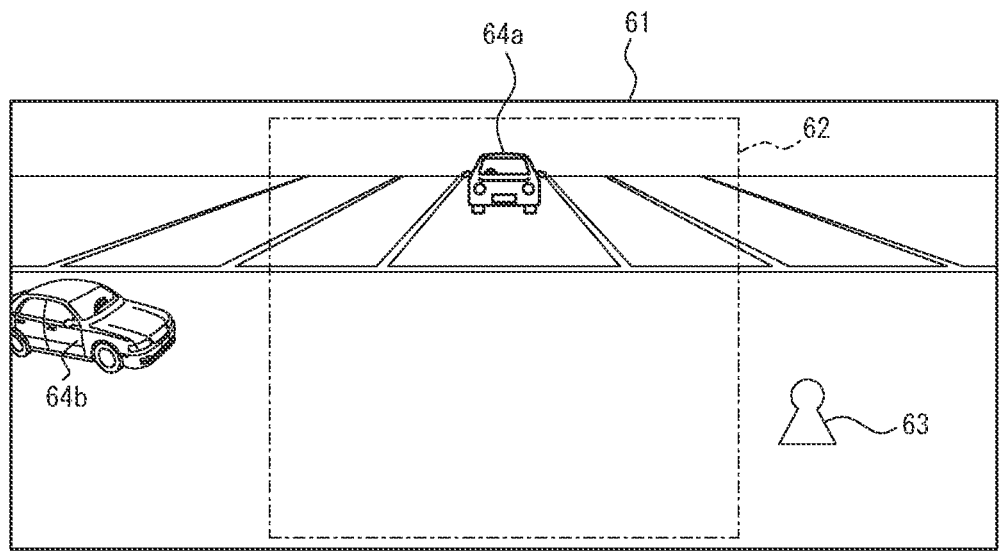
FIG. 27 is a diagram illustrating an eighth example of the first video image.

FIG. 27 illustrates an eighth example of the detection region 61 of the first video image acquired from the imaging apparatus 20 by the image processing apparatus 30. The imaging apparatus 20 may be arranged to capture a rear area behind the moving body 50 as the vehicle. In the example illustrated in FIG. 27, the detection region 61 is longer in the left-right direction than the up-down direction. The display region 62 is positioned at the center of the left-right direction of the detection region 61. The controller 33 may detect each of the pedestrian 63 and the vehicle 64*b* as the detection objects captured in the second region inside of the detection region 61 and outside of the display region 62 of the first video image. In the eighth example, the controller 33 determines that a depth direction distance to the vehicle 64*a* captured in the display region 62 is longer than a predetermined distance and thus does not treat the vehicle 64*a* as a detection object.

Figure 28:
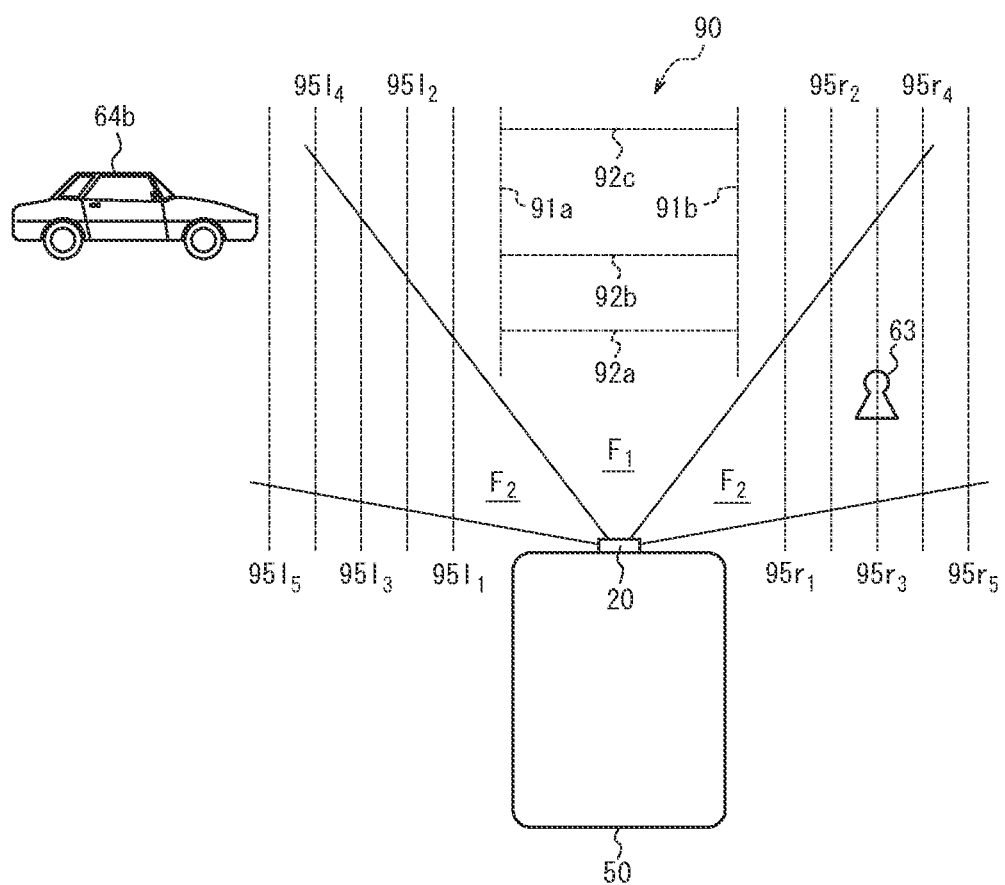
FIG. 28 is a diagram illustrating a positional relationship between a vehicle and a detection object.

FIG. 28 is a diagram schematically illustrating locations of the moving body 50 and the pedestrian 63 and the vehicle 64*b* as the detection objects viewed from above along the height direction in the real space captured in the first video image. The imaging apparatus 20 can capture subjects within regions $F_1$ and $F_2$ in the real space. The regions $F_1$ and $F_2$ correspond to the detection region 61 of the first video image. The region $F_1$ is the first region corresponding to the display region 62 of the first video image. The region $F_2$ corresponds to the second region inside of the detection region 61 of the first video image and outside of the display region 62.

FIG. 28 illustrates a virtual guide wall 90 in broken lines obtained by mapping the guide wall image 80 of the second video image in the real space, for the purpose of illustration. Virtual side walls 91*a* and 91*b* correspond to the side wall images 81*a* and 81*b* displayed in the second video image, respectively. Virtual distance walls 92*a*, 92*b*, and 92*c* correspond to the distance wall images 82*a*, 82*b*, and 82*c* in the second video image, respectively.

In FIG. 28, also, each of virtual lines $95l_1$ to $95l_5$ and $95r_1$ to $95r_5$ shown as broken lines indicates a horizontal direction distance between the virtual side walls 91*a* and 91*b* of the moving body 50 and the detection object, for the purpose of illustration. The horizontal direction distance is also referred to as a second distance. The virtual lines $95l_1$ to $95l_5$ are positioned on the left side of the moving body 50. The virtual lines $95r_1$ to $95r_5$ are positioned on the right side of the moving body 50. Intervals between the virtual lines $95l_1$ to $95l_5$ and between the virtual lines $95r_1$ to $95r_5$ may be appropriately determined. Intervals between the virtual lines $95l_1$ to $95l_5$ and between the virtual lines $95r_1$ to $95r_5$ may be equal to one another. The controller 33 can determine which one of the virtual lines $95r_1$ to $95r_5$ and $95r_1$ to $95r_5$ is closest to the detection object, or which two of the virtual lines $95l_1$ to $95l_5$ and $95r_1$ to $95r_5$ include the detection object in a region therebetween, on the basis of the first video image.

Figure 29:
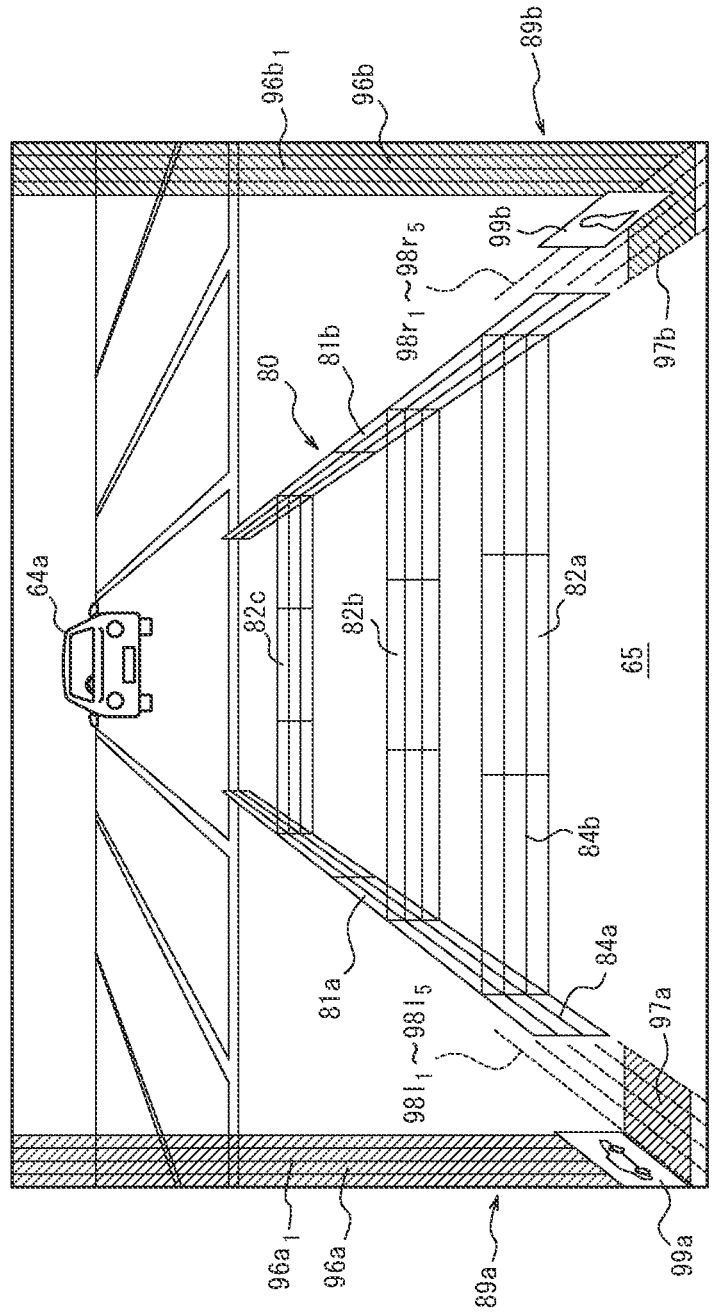
FIG. 29 is a diagram illustrating an eighth example of the second video image corresponding to a display region of a first video image of FIG. 24.

The second video image corresponding to the first video image of FIG. 27 is illustrated in FIG. 29 by way of example. In the eighth example, the guide wall image 80 may be displayed in a display method similar to those described in the sixth example and the seventh example. When the detection objects are located in the second region of the first video image, the controller 33 synthesizes the second recognition wall images 89*a* and 89*b* in the edge region on the side where the detection objects are located in the second video image. The second recognition wall images 89*a* and 89*b* may include wall portions 96*a* and 96*b* extending in the height direction and the depth direction and floor portions 97*a* and 97*b* extending in the depth direction and the horizontal direction. The wall portions 96*a* and 96*b* extend from the bottom edge region to top edge region in the left-side and right-side edge regions of the second video image in FIG. 29. The wall portions 96*a* and 96*b* may extend partially in the up-down direction at the left-side and right-side edge regions of the second video image instead of extending throughout the up-down direction. Similarly, the floor portions 97*a* and 97*b* may extend partially or entirely in the left-right direction at the bottom edge of the second image. The floor portions 97*a* and 97*b* may be displayed between the guide wall image 80 and the bottom edge of the second video image.

The controller 33 may change the displays of the second recognition wall images 89*a* and 89*b* on the basis of the second distances of the detection objects. The change of display includes change of color, transmittance, color saturation, brightness, size, as well as dynamic display methods including flashing and moving. In one of a plurality of embodiments, the change of display may be, for example, a change of color. As for the display color, red, yellow, and blue may correspond to a high risk, a medium risk, and a low risk, respectively. The pedestrian 63 illustrated in FIG. 28 is located on the virtual line $95r_3$ which is the third to the right side in the horizontal direction from the virtual side wall 91*b* of the moving body 50. In this case, the controller 33 may determine that there is a medium risk and display the second recognition wall image 89*b* on the right side in yellow. Also, the vehicle 64*b* illustrated in FIG. 28 is located remote from the virtual line $95l_5$ which is fifth to the left side in the horizontal direction from the virtual side wall 91*a* of the moving body 50. In this case, the controller 33 may determine that there is a low risk and display the second recognition wall image 89*a* on the left side in blue. In one of the plurality of embodiments, the change of the displays may include a lateral movement of the auxiliary lines 96*a*1 and 96*b*$_1$ that vertically extend in the wall portions 96*a* and 96*b*. The controller 33 may change the moving speed of the wall portions 96*a* and 96*b* in accordance with the length of the second distance.

The second recognition wall images 89*a* and 89*b* may be semitransparent. Display characteristics of each of the wall portion 96*a* of the second recognition wall image 89*a* and the wall portion 96*b* of the second recognition wall image 89*b* may be varied in the up-down direction. For example, each of the wall portion 96*a* of the second recognition wall image 89*a* and the wall portion 96*b* of the second recognition wall image 89*b* may have a transmittance that decreases in the downward direction. Also, each of the second recognition wall image 89a and the second recognition wall image 89b may have a color density that increases in the upward direction. Display characteristics of each of the floor portion 97a of the second recognition wall images 89a and the floor portion 97b of the second recognition wall images 89b may be varied in the left-right direction. For example, the floor portion 97a of the second recognition wall image 89a may have a transmittance that increases from the left side toward the center of the second video image, and the floor portion 97b of the second recognition wall image 89b may have a transmittance that increases from the right side toward the center of the second video image. Also, the floor portion 97a of the second recognition wall image 89a may have a color saturation that decreases from the left side toward the center of the second image, and the floor portion 97b of the second recognition wall image 89b may have a color saturation that decreases from the right side toward the center of the second image. The color saturation can also be referred to as a color density of the image.

The controller 33 may determine the types of the detection objects and display icon images 99a and 99b corresponding to the types on the floor portions 97a and 97b of the second recognition wall images 89a and 89b. A known technology may be employed for the determination of the type on the basis of the image of the detection object detected in the first video images. For example, the controller 33 may determine the type of an object by performing pattern matching of an outline shape of the detection object using a model pattern. For example, an icon of a person motif may be selected for the pedestrian 63, and an icon of a vehicle motif may be selected for the vehicle 64b. The controller 33 can estimate the second distance in the horizontal direction between the virtual side walls 91a and 91b obtained by mapping the side wall images 81a and 81b in the real space and the detection object in the real space. The second distance can be determined on the basis of a positional relationship between each line obtained by mapping the virtual lines $95l_1$ to $95l_5$ and $95r_1$ to $95r_5$ in the real space onto the detection region 61 of the first video image and the image of each of the detection objects. The controller 33 may change the display positions of the icon images 99a and 99b on the basis of the second distance.

In the display example of the second video image illustrated in FIG. 29, first distance recognition lines $98l_1$ to $98l_5$ and $98r_1$ to $98r_5$ are provided in a manner corresponding to the virtual lines $95l_1$ to $95l_5$ and $95r_1$ to $95r_5$ of the real space, respectively. The first distance recognition lines $98l_1$ to $98l_5$ are positioned on the left side of the side wall image 81a and arranged sequentially from the center to the left side. The first distance recognition lines $98r_1$ to $98r_5$ are positioned on the right side of the side wall image 81b and arranged sequentially from the center to the right side. Each of the first distance recognition lines $98l_1$ to $98l_5$ and $98r_1$ to $98r_5$ indicates a display position of the icon images 99a and 99b and does not need to be displayed in the second video image.

In FIG. 28, the pedestrian 63 is located on the virtual line $95r_3$, which is the third on the right side in the horizontal direction from the virtual side wall 91b of the moving body 50. Thus, the controller 33 may display the icon image 99b of the pedestrian 63 on the first distance recognition line $98r_3$, which is the third on the right side, in the second video image of FIG. 29. As illustrated in FIG. 29, the icon image 99b may be displayed in the three-dimensional manner as a surface having a depth-direction length and a height-direction length on the first distance recognition line $98r_3$ extending in the depth direction in the second video image. When viewed stereoscopically, the icon image 99b may be displayed as a surface parallel to the sidewall images 81a and 81b and the second recognition wall images 89a and 89b. The display mode of the icon image 99b such as the color, color saturation, and brightness may be changed on the basis of the second distance, in a manner similar to the second recognition wall 89b. For example, the icon image 99b may be displayed in yellow.

In FIG. 28, the vehicle 64b is located remote from the virtual line $95l_5$ which is the fifth on the left side in the horizontal direction from the virtual side wall 91a of the moving body 50. In this case, the controller 33 may position the icon image 99a of the vehicle 64b on the first distance recognition line $98l_5$ positioned on the left side in the second video image of FIG. 29. Alternatively, the controller 33 may arrange the icon image 99a such that the icon image 99a seems to be positioned on the same surface as the wall portion 96a of the second recognition wall image 89a when the second video image is viewed stereoscopically. The display mode of the icon image 99a may be changed on the basis of the second distance, in a manner similar to the icon image 99b. For example, the icon image 99a may be displayed in blue.

When one or both of the moving body 50 and the detection objects move and the position of the detection object relative to the moving body 50 changes, the position and the display mode of each of the second recognition wall images 89a and 89b and each of the icon images 99a and 99b also change. When the moving body 50 enters the display region 62, the detection objects may be displayed in the display mode as described in the seventh example. An example of a change in the display mode when the vehicle 64b moves from the region $F_2$ to the region $F_1$ in the real space illustrated in FIG. 28 will be described.

First, it is assumed that the vehicle 64b is located on the left side of the virtual line $95l_5$ in the real space in FIG. 28. At this time, as described above, the second recognition wall image 89a is displayed in the second video image of FIG. 29 and, simultaneously, the icon image 99a is displayed on the leftmost side of the floor portion 98a of the second recognition wall image 89a. At this time, the second recognition wall image 89a and the icon image 99a may be displayed in blue.

In the real space of FIG. 28, as the vehicle 64b approaches closer to the virtual guide wall 90, the display mode of the second recognition wall image 89a displayed in the second video image of FIG. 29 is changed. For example, the color of the second recognition wall image 89a is sequentially changed from blue to yellow and then to red. Concurrently, the display position of the icon image 99a is moved from the first distance recognition line $98l_5$ to the first distance recognition line $98l_1$. The color of the icon image 99a may be sequentially changed from blue to yellow and then red. Thus, the subject 60 can recognize that the vehicle 64b is approaching outside of the second video image. Also, because the three-dimensional display is employed, the subject 60 can spatially recognize the approach of the vehicle 64b, and the probability of oversight of information can be reduced.

When the vehicle 64b is approaching the moving body 50, the icon image 99a may be moved toward the center of the image. The subject 60 can recognize the moving direction of the vehicle 64b by viewing the movement of the icon image 99a.

Further, when the vehicle 64b enters the region $F_1$ from the region $F_2$ in the real space of FIG. 28, the vehicle 64b enters the display region of the first video images and thus is included in the second video images and displayed on the display apparatus 40. Also, the second recognition wall image 89a is hidden, and the first recognition wall image 83a is displayed on the side of the vehicle 64b opposing the guide wall image 80 as illustrated in FIG. 26. When the second recognition wall image 89a is hidden, the controller 33 may flash the second recognition wall image 89a a plurality of times so as to alert the subject 60. The controller 33 displays the first recognition wall image 83a on the side of the vehicle 64b opposing to the moving body 50. Further, the controller 33 estimates the second predicted path of the vehicle 64b and estimates the first position where the second predicted path and the side wall images 81a and 81b intersect with one another. The controller 33 may change the display mode of the portion 81$a_1$ of the side wall image 81a that includes the first position. The controller 33 may sequentially change the color of the portion 81$a_1$ of the side wall image 81a from, for example, blue to yellow and then to red, as the vehicle 64b approaches closer. This enables the subject 60 to easily recognize that the vehicle 64b is approaching and also that the second predicted path of the vehicle 64b overlaps with the first predicted path 65 of the moving body 50.

According to the one of the plurality of embodiments of the present disclosure, as described above, the three-dimensional displays of the guide wall image, the first recognition wall image, and the second recognition wall image facilitate the spatial recognition of a position of a detection object. According to the one of the plurality of embodiments of the present disclosure, also, the change of the display mode of each of the wall surfaces facilitates recognition of information such as a caution and warning. Further, the three-dimensional display can reduce the probability of oversight of the information.

Example Variation

Figure 30:
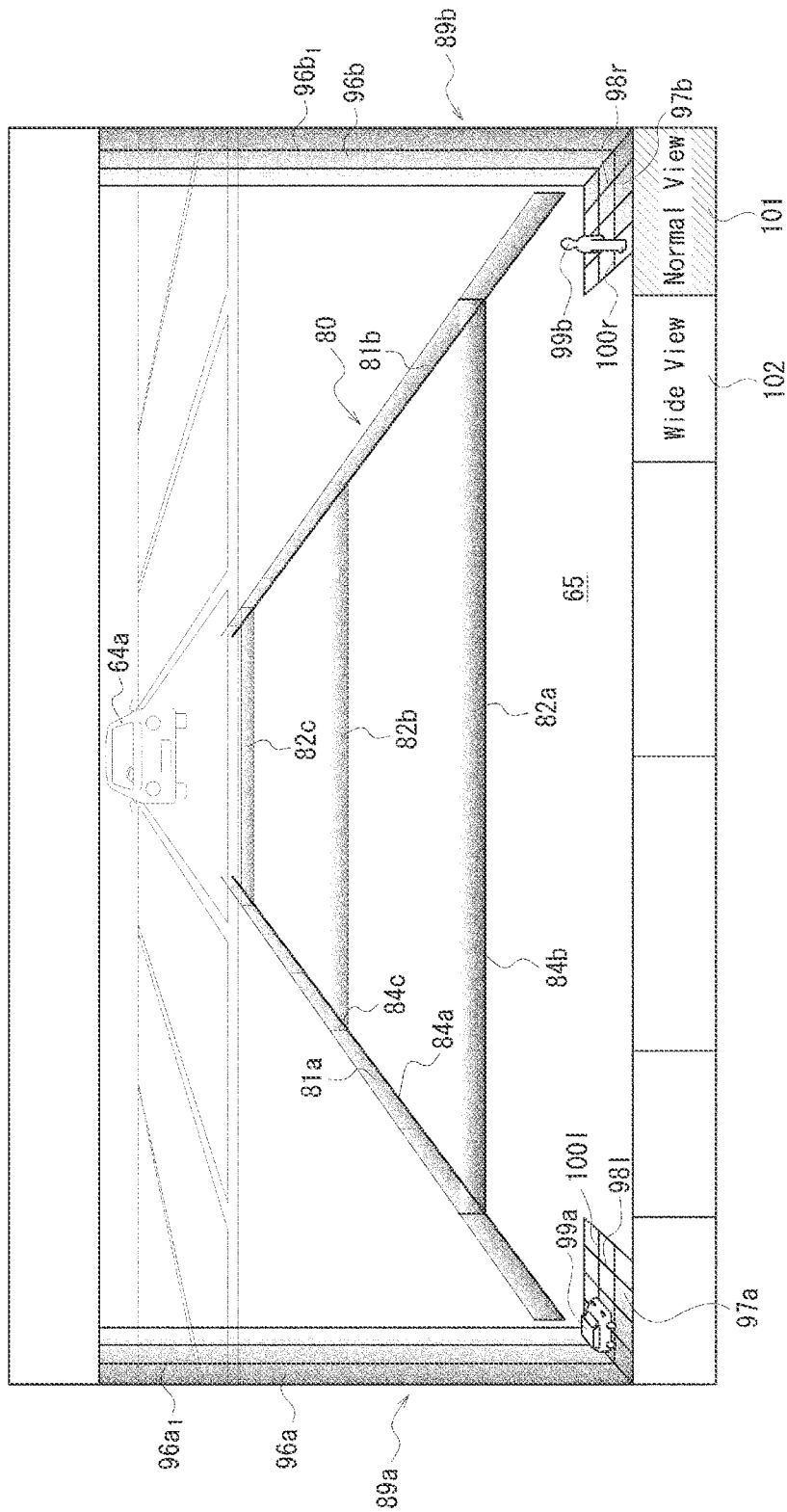
FIG. 30 is a diagram illustrating an example variation of the eighth example of the second video image.

FIG. 30 illustrates another example of the second video image corresponding to the first video image of FIG. 27. View display regions 101 and 102 that indicate a selection state between "Normal View Display" and "Wide View Display" are added to the lower left portion in FIG. 30. The "Normal View Display" and the "Wide View Display" will be described later. Some of the display modes of the guide wall image 80, the second recognition wall images 89a and 89b, and the icon images 99a and 99b in FIG. 30 may be different from those of FIG. 29. For example, FIG. 30 illustrates the guide wall image 80 in the display mode similar to that of FIG. 22.

The wall portions 96a and 96b of the second recognition wall images 89a and 89b may include at least auxiliary lines 96$a_1$ and 96$b_1$, respectively, that extend in the height direction. One of the plurality of auxiliary lines 96$a_1$ of the wall portion 96a and one of the plurality of auxiliary lines 96$b_1$ of the wall portion 96b are denoted with the respective reference signs in FIG. 30. The wall portions 96a and 96b of the second recognition wall images 89a and 89b may indicate the distance to the detection object by using a color and may have transmittance that varies from the front side to the rear side in the depth direction. The wall portions 96a and 96b may have transmittances that gradually increase in the height direction or may have color saturations that gradually decrease and vanish at a predetermined height position.

By changing the transmittance and the color saturation of the wall portions 96a and 96b and the display modes of the auxiliary lines 96$a_1$ and 96$a_2$, the controller 33 can indicate that an object is present within the predetermined distance range and also indicate a distance to the detection object or a change of the distance to the detection object. The change of the transmittance or the color saturation of the wall portions 96a and 96b may be referred to as change in gradation. For example, the controller 33 may indicate that a detection object is present within the predetermined distance by moving the auxiliary lines 96$a_1$ and 96$a_2$ of the wall portions 96a and 96b. The controller 33 may indicate that a detection object is present within the predetermined distance by increasing the color saturations of the front portions of the wall portions 96a and 96b to a maximum and gradually reducing their color saturations in the depth direction. The auxiliary lines 96$a_1$ and 96$b_1$ of the wall portions 96a and 96b and the changes in their transmittances are not essential. The controller 33 may omit the auxiliary lines 96$a_1$ and 96$b_1$ from the wall portions 96a and 96b. The controller 33 does not need to display changes (the gradations) in the transmittances of the wall portions 96a and 96b.

The floor portions 97a and 97b of the second recognition wall images 89a and 89b are provided with one or more second distance recognition lines 100l and 100r, respectively, in addition to the first distance recognition lines 98l and 98r. In FIG. 30, a plurality of the second distance recognition lines 100l, 100r exist but for each only one reference sign is denoted. The first distance recognition lines 98l and 98r and the second distance recognition lines 100l and 100r do not need to be displayed on the display. The first distance recognition lines 98l and 98r may correspond to the horizontal direction distances between the moving body 50 and the detection objects, and the second distance recognition lines 100l and 100r may correspond to the depth direction distances between the moving body 50 and the detection objects. Each of the plurality of the second distance recognition walls 100l and 100r may correspond to the depth direction distance when the auxiliary lines 84c of the side wall images 81a and 81b extending in the height direction are mapped in the real space.

The subject 60 can recognize the horizontal direction distance and the depth direction distance to the detection object on the basis of the positions of the icon images 99a and 99b on the floor portions 97a and 97b with respect to the horizontal direction and the depth direction. The icon images 99a and 99b are three-dimensional images corresponding to the types of the detection objects. The floor portions 97a and 97b may be positioned on the front side of the front ends of the side wall images 81a and 81b and within the lines extended from the side wall images 81a and 81b. The positional relationship between the second recognition wall images 89a and 89b and the guide wall image 80 is not limited thereto and may be changed appropriately.

In FIG. 30, the display apparatus 40 displays the view display regions 101 and 102 that indicate the selection status between the "Normal View Display" and the "Wide View Display" in the lower right portion. The "Normal View Display" and the "Wide View Display" displays a video image in different angles. In one of a plurality of embodiments, the "Normal View Display" corresponds to the angle of the display region 62 of the second video image illustrated in FIG. 4. In one of a plurality of embodiments, the "Wide View Display" corresponds to the angle of the detection region 61 of the first video image illustrated in FIG. 4. The "Wide View Display" does not need to display the detection region 61 of the first video image in its entirety and may display a video image in an angle that includes the "second video image" extracted from the detection region 61. The second video images illustrated in and before FIG. 30 are displayed in the "Normal View Display". Which one of the "Normal View Display" and the "Wide View Display" is selected for the video image being displayed is indicated by changing the display of the view display regions 101 and 102 indicating the selection status. For example, the change of the display of the view display regions indicating the selection status includes a change of the color, the color saturation, and the color of characters of the view display regions 101 and 102.

The controller 33 may change between the "Normal View Display" and the "Wide View Display" according to an image processing result of the first video image, or upon receiving an input in respect of the display apparatus 40 from the subject 60 and the like. For example, when the controller 33 detects the approach of a detection object in the "Normal View Display", the controller 33 may change the displayed video image to the "Wide View Display". When the controller 33 does not detect a detection object within the predetermined region in the "Wide View Display", the controller 33 may change the displayed video image to the "Normal View Display". When the display apparatus 40 includes a touch panel screen, the controller 33 may change the display mode upon receiving a signal from the display apparatus 40 indicating that the subject 60 has performed a selection by touching the view display region 101 or 102 on the touch panel screen.

Figure 31:
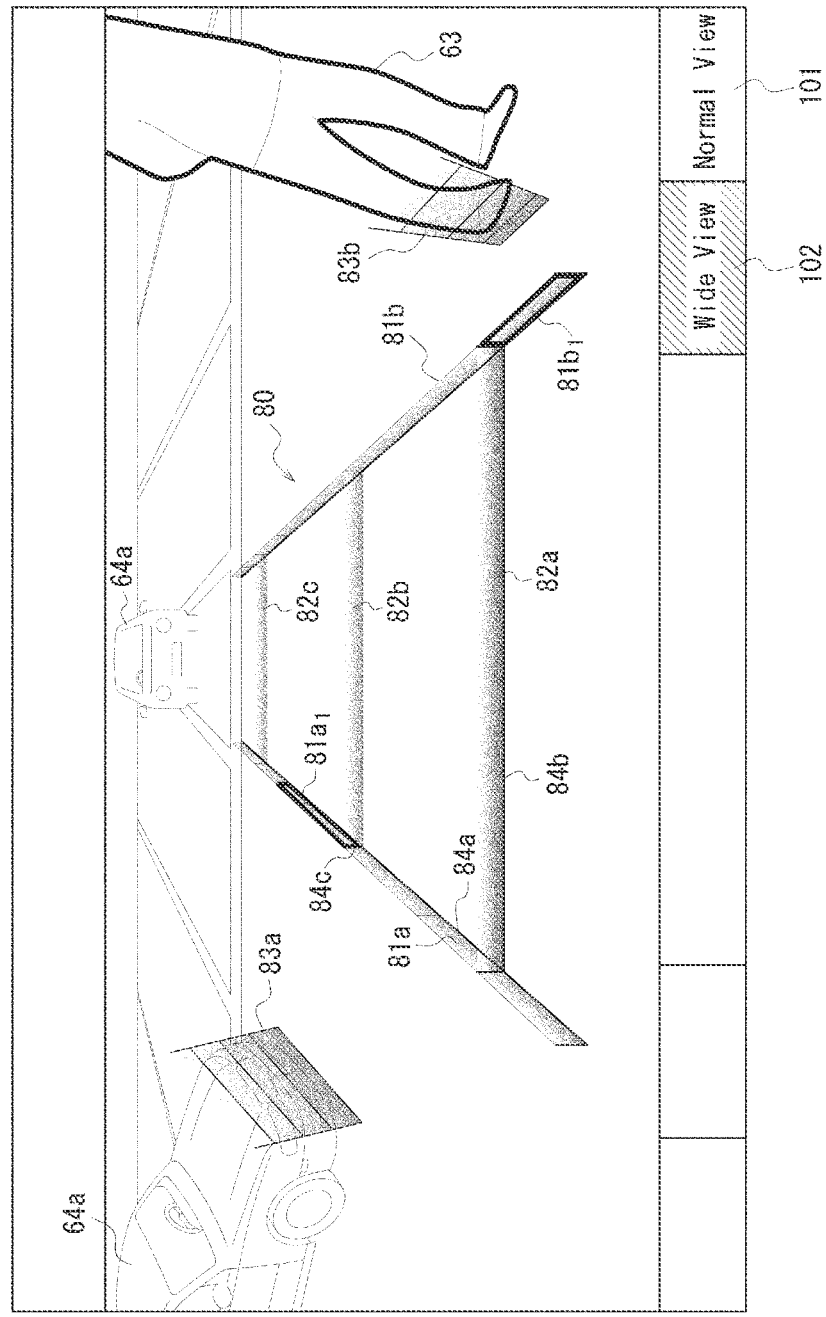
FIG. 31 is a diagram illustrating an example in which a display region of FIG. 30 is changed into a Wide View Display.

FIG. 31 is a diagram illustrating an example of a video image that has been changed from the "Normal View Display" illustrated in FIG. 30 to the "Wide View Display". The view angle of the video image in the "Wide View Display" is wider in the horizontal direction than that in the "Normal View Display" in FIG. 30. In FIG. 31, the pedestrian 63 and the vehicle 64b located outside of the display region in the "Normal View Display" illustrated in FIG. 30 are displayed. In the video image illustrated in FIG. 31, because the view angle is wider in the horizontal direction than that in the "Normal View Display" of FIG. 30, the space between the side wall images 81a and 81b on the left right sides of the guide wall image 80 is relatively reduced.

In FIG. 31, because the pedestrian 63 and the vehicle 64b are within the display region, the second recognition wall images 89a and 89b are not displayed. The controller 33 may recognize the vehicle 64b and the pedestrian 63 as the detection objects within the detection region 61 of the first video image and display the first recognition wall images 83a and 83b as virtual flat planes on the sides of the vehicle 64b and the pedestrian 63 opposing to the moving body 50. The controller 33 estimates the locations of the vehicle 64b and the pedestrian 63 as the detection objects in the depth direction. On the basis of the estimated locations, the controller 33 may change the display of the side wall images 81a and 81b opposing to the vehicle 64b and the pedestrian 63. In FIG. 31, the display of the portion $81b_1$ of the side wall image 81b and the portion $81a_1$ of the side wall image 81a are changed in correspondence with the pedestrian 63 and the vehicle 64b, respectively. Changes of display includes a variety of aspects. For example, the change of display includes changes of color, changes of thickness of the auxiliary lines surrounding the outer periphery, changes of type of the lines, starting and stopping flashing, change to a flashing cycle, or the like. The display methods and the display modes of the first recognition wall images 83a and 83b, the portion 81a1 of the side wall image 81a, and the portion 81b1 of the side wall image 81b may be similar to those of the example of FIG. 26.

According to the one of the plurality of embodiments as illustrated in FIG. 30 and FIG. 31, the video image captured by the imaging apparatus 20 may be displayed on the display apparatus 40 in the "Normal View Display" or the "Wide View Display" having different view angles in a switchable manner. The "Normal View Display" enables the subject 60 to easily recognize the presence and the location of the detection object located outside of the region of the video image being displayed by viewing the second recognition wall images 89a and 89b and the icon images 99a and 99b. The autonomous or manual switchover between the "Normal View Display" and the "Wide View Display" by the display apparatus 40 enables the subject 60 to recognize the detection object, detected outside of the image in the "Normal View Display", in the video image. The "Wide View Display" enables stereoscopic recognition of the positional relationship with the detection object by displaying the guide wall image 80 and the first recognition wall image 83b. In this way, the display system 10 according to the one of the plurality of embodiments can enable the subject 60 to easily grasp the surrounding situation and be aware of risks.

Another Example

Figure 32:
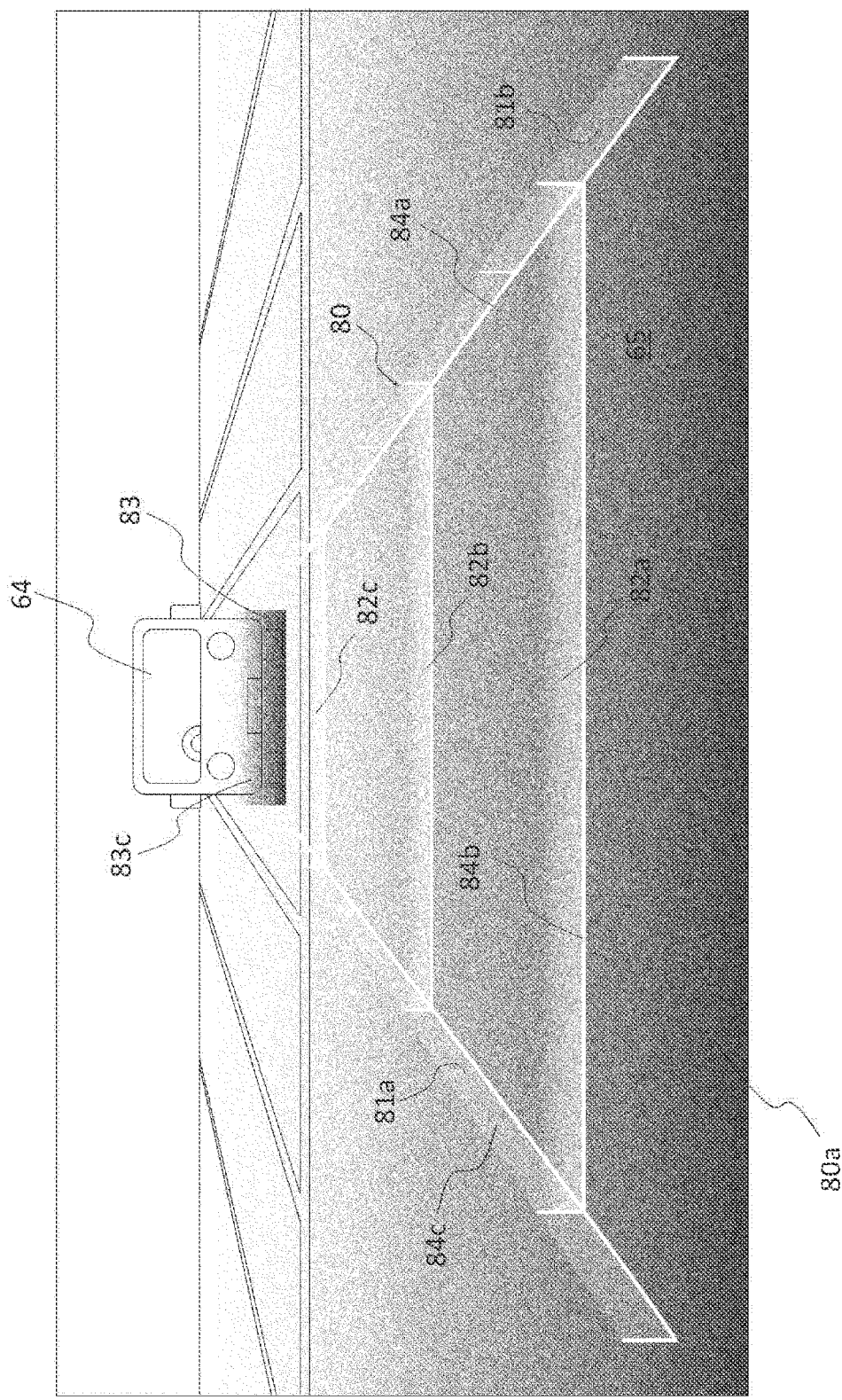
FIG. 32 is a diagram illustrating another example of the second video image.

FIG. 32 illustrates another example of the second video image. FIG. 32 corresponds to FIG. 24. In FIG. 32, the guide wall image 80 is displayed by white lines. In FIG. 32, the first recognition wall image 83 is displayed by white lines. In the example of FIG. 32, the second video image includes a first semitransparent image 80a. In the example of FIG. 32, the second video image includes a second semitransparent image 83c.

The controller 33 may generate the second video image by sequentially superimposing a first image and a second image on the display region of the first video images obtained from the imaging apparatus 20. The controller 33 may generate a synthesized image by sequentially superimposing the first image and the second image in the stated order on each frame image of the first video images. The controller 33 may output the second video images and cause the display apparatus 40 to display the second video images. The second images may include the guide wall image 80 that indicates the first predicted path 65 of the moving body 50. The first images include the first semitransparent image 80a (a transmittance gradation image) that has a transmittance that gradually increases moving in the upward direction. The controller 33 may superimpose the guide wall image 80 on the first semitransparent image 80a. The controller 33 may superimpose the first semitransparent image 80a on the display region of the first video images. The controller 33 may synthesize the first semitransparent image 80a between the display region of the first video images and the guide wall image 80. The first semitransparent image 80a has a transmittance that gradually that decreases moving in the downward direction. The first semitransparent image 80a changes its color to transparent toward the top edge region from the bottom edge region. The first semitransparent image 80a gradually changes its color to transparent from a second color different from a first color of the guide wall image 80. The first color may include, for example, white or cyan. The second color may include, for example, black.

By virtue of the color difference between the first color and the second color, the guide wall image 80 can be easily viewed. By virtue of the color difference between the first color and the second color, the guide wall image 80 can be easily viewed in a situation where the first video image includes a large amount of color that is similar to the first color. For the guide wall image 80 illustrated in the example of FIG. 32, the first semitransparent image 80*a* facilitates recognition on a ground surface covered with snow. Because the guide wall image 80 has transmittance that increases in the upward direction, the second image becomes similar to the first image in an upper portion of the guide wall image 80. The second video image does not include a large amount of added color in regions displaying remote areas. The second video images have less impact on the visibility of the regions on the rear side of the guide wall image 80. Because the first semitransparent image 80*a* has transmittance that increases from the lower side to the upper side, it becomes easier to ascertain a sense of depth in the second video images. Because the first semitransparent image 80*a* has transmittance that increases from the lower side to the upper side, the second video image conveys a bright impression.

The controller 33 may generate the second video images by sequentially superimposing the third image and the fourth image on the display region of the detection object recognized in the first video image. The fourth image may include the first recognition wall image 83 that indicates the presence of the recognized detection object. The third image includes the second semitransparent image 83*c*. The controller 33 may superimpose the first recognition wall image 83 on the second semitransparent image 83*c*. The controller 33 may superimpose the second semitransparent image 83*c* on the display region of the detection object. The controller 33 may synthesize the second semitransparent image 83*c* between the display region of the detection object and the first recognition wall image 83. The second semitransparent image 83*c* has a transmittance that gradually decreases in the downward direction. The second semitransparent image 83*c* changes its color to transparent toward its top edge region from its bottom edge region. The second semitransparent image 83*c* gradually changes its color to transparent from a fourth color different from a third color of the first recognition wall image 83. The second semitransparent image 83*c* gradually changes from the fourth color different from the third color of the first recognition wall image 83 to a transparent color. The third color may include, for example, red, yellow, and white or cyan. The second color may include, for example, black.

By virtue of the color difference between the third color and the fourth color, the first recognition wall image 83 can be easily recognized and, also, the first recognition wall image 83 may be easily recognized when a detection object is of color similar to the third color.

The presence of the second semitransparent image 83*c* facilitates recognition of the first recognition wall image 83 in white as illustrated in the example of FIG. 32 when the first recognition wall image 83 is displayed in front of a white track.

Although the present disclosure has been described based on various figures and embodiments, it should be appreciated that those who are skilled in the art may easily perform various changes or modifications on the basis of the present disclosure. Accordingly, such changes and modifications are included in the scope of the present disclosure. For example, a function included in each means or each step may be rearranged, avoiding a logical inconsistency, such that a plurality of means or steps are combined, or a means or a step is subdivided.

For example, each constituent element and function of the display system 10 in the above embodiment may be rearranged. For example, some or all of the configurations and functions of the image processing apparatus 30 may be included in at least one of the imaging apparatus 20 and the display apparatus 40.

Some of the constituent elements of the display system 10 in the above embodiment may be positioned outside of the moving body 5. For example, the image processing apparatus 30 and the like may be configured as a communication apparatus such as a mobile phone or an external server and connected to other constituent elements of the display system 10 in a wired or wireless manner.

REFERENCE SIGNS LIST

10 display system
20 imaging apparatus
21 imaging optical system
22 image sensor
23 communication interface
24 controller
30 image processing apparatus
31 communication interface
32 memory
33 controller
40 display apparatus
50 moving body
51 network
60 subject
61 detection region
62 display region
63, 63*a*, 63*b*, 63*c*, 63*d* pedestrian
64, 64*a*, 64*b* vehicle
65 first predicted path
66 guide line
67 icon image
68 third marker
69 outline
70 region
71 first marker
72 second marker
73 fifth marker
73*a* icon image
73*b* band image
73*c* right-side edge region
74 obstacle image
75*a*, 75*b*, 75*c* sixth marker
80 first semitransparent image
81*a*, 81*b* side wall image
81*a*$_1$, 81*b*$_1$ portion of side wall image
82*a*, 83*b*, 82*c* distance wall image
83, 83*a*, 83*b* first recognition wall image
83*c* second semitransparent image
84*a*, 84*b*, 84*c* auxiliary line
89*a*, 89*b* second recognition wall image
90 virtual guide wall
91*a*, 91*b* virtual side wall
92*a*, 92*b*, 92*c* virtual distance wall
95*l*$_1$ to 95*l*$_5$, 95*r*$_1$ to 95*r*$_5$ virtual line
96*a*, 96*b* wall portion
97*a*, 97*b* floor portion
98*l*$_1$ to 98*l*$_5$, 98*r*$_1$ to 98*r*$_5$ first distance recognition line
99*a*, 99*b* icon image
100*l*, 100*r* second distance recognition line
101, 102 view display region

The invention claimed is:

1. A display control system for equipping to a vehicle, the display system comprising:
   a display apparatus configured to display an image; and
   a controller configured to cause a marker to be displayed on the display apparatus when an object located on a right rear side or a left rear side of the vehicle and outside a display area displayed on the display apparatus is detected while distance between the vehicle and the object decreases, wherein:
   the display apparatus is configured to display a second image that is an image of the rear of the vehicle; and
   the controller is configured to cause the marker to be displayed when the object is not captured in the second image.

2. The display system according to claim 1, wherein
   the display apparatus displays an overhead image that is an image of the vehicle viewed from above; and
   the controller is configured to cause the marker to be displayed on the left side or the right side of the display apparatus, that is displaying the overhead image, in accordance with the position of the object.

3. The display system according to claim 1, wherein:
   the controller is configured to cause the marker to be displayed when the distance between the object and the vehicle decreases.

4. The display system according to claim 1, wherein the controller is configured to cause the marker to be displayed when the rate of decrease in the distance between the object and the vehicle is equal to or greater than a predetermined threshold value.

5. The display system according to claim 2, wherein the controller is configured to change the width of the marker and cause the marker to be displayed.

6. The display system according to claim 2, wherein the controller is configured to change the width of the marker in accordance with the distance between the object and the vehicle and cause the marker to be displayed.

7. The display system according to claim 1, wherein the controller is configured to cause the marker to be displayed on the left edge or the right edge of the image in accordance with the position of the object.

8. The display system according to claim 2, wherein the controller is configured to lengthen a display area of the second image displayed on the display apparatus in accordance with a user operation.

9. A moving object equipped with the display system according to claim 1.

10. An image processing apparatus for equipping to a vehicle, the image processing apparatus comprising:
    a display apparatus configured to display an image; and
    a controller configured to cause a marker to be displayed on the display apparatus when an object is detected on a right rear side or a left rear side of the vehicle while distance between the vehicle and the object decreases, wherein:
    the display apparatus is configured to display a second image that is an image of the rear of the vehicle; and
    the controller is configured to cause the marker to be displayed when the object is not captured in the second image.

* * * * *